United States Patent
Ichimura et al.

(10) Patent No.: US 11,061,236 B2
(45) Date of Patent: Jul. 13, 2021

(54) HEAD-MOUNTED DISPLAY AND CONTROL METHOD THEREOF

(71) Applicant: Panasonic Intellectual Property Management Co., Ltd., Osaka (JP)

(72) Inventors: Daijiroh Ichimura, Hyogo (JP); Kazuhiro Tsuga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/204,179

(22) Filed: Nov. 29, 2018

(65) Prior Publication Data

US 2019/0179147 A1 Jun. 13, 2019

(30) Foreign Application Priority Data

Dec. 7, 2017 (JP) .............................. JP2017-235138
Sep. 14, 2018 (JP) .............................. JP2018-173072

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/012* (2013.01); *G06F 3/167* (2013.01);
(Continued)

(58) Field of Classification Search
None
See application file for complete search history.

(56) References Cited

U.S. PATENT DOCUMENTS 9,848,273 B1\* 12/2017 Helwani ............... H04R 25/552
2015/0302867 A1\* 10/2015 Tomlin .................... G10L 25/78
704/270

(Continued)

FOREIGN PATENT DOCUMENTS

WO  2014/156388  10/2014
WO  2017/056604  4/2017

OTHER PUBLICATIONS

Misaki Tsujikawa et al., "Study on i-vector based speaker identification for short utterances", IEICE Technical Report, vol. 115, No. 99, SP2015-12, pp. 65-70, Jun. 2015 (with English abstract).

(Continued)

*Primary Examiner* — Amare Mengistu
*Assistant Examiner* — Sarvesh J Nadkarni
(74) *Attorney, Agent, or Firm* — Wenderoth, Lind & Ponack, L.L.P.

(57) ABSTRACT

The present disclosure provides a head-mounted display that achieves smooth communication that allows a wearer of the head-mounted display and an outside person to understand their intentions with each other, and a control method of controlling the head-mounted display. Head-mounted display includes: sound receiver that receives a sound coming from a specific direction; voice detector that detects a voice from the sound received by sound receiver; head movement detector that detects movement of the head of the wearer of head-mounted display; external display that displays externally visible information; and response detector that, when voice detector detects the voice, and head movement detector detects movement of the head of the wearer facing toward the specific direction, displays information indicating that the wearer has responded to the voice on external display.

13 Claims, 20 Drawing Sheets

(51) Int. Cl.
  *G10L 25/78* (2013.01)
  *G06F 3/16* (2006.01)
(52) U.S. Cl.
  CPC ........ *G10L 25/78* (2013.01); *G02B 2027/014* (2013.01); *G02B 2027/0132* (2013.01); *G02B 2027/0141* (2013.01)

(56) References Cited

U.S. PATENT DOCUMENTS

| | | |
|---|---|---|
| 2016/0018655 A1 | 1/2016 | Imoto et al. |
| 2017/0255447 A1* | 9/2017 | Sendai ............... G02B 27/0172 |
| 2017/0364153 A1* | 12/2017 | Kazansky ............ G06F 3/0304 |
| 2018/0137879 A1* | 5/2018 | Tomlin .................. G10L 25/48 |
| 2018/0139565 A1* | 5/2018 | Norris .................... H04S 7/304 |
| 2018/0260187 A1* | 9/2018 | Yasuda .................. H04M 11/06 |
| 2019/0392830 A1* | 12/2019 | Abdollahian ........ G02B 27/017 |

OTHER PUBLICATIONS

Extended European Search Report dated Apr. 5, 2019 in corresponding European Patent Application No. 18208559.7.

* cited by examiner

HEAD-MOUNTED DISPLAY AND CONTROL METHOD THEREOF

CROSS REFERENCE TO RELATED APPLICATIONS

This application claims the benefit of priority of Japanese Patent Application Number 2017-235138 filed on Dec. 7, 2017, and Japanese Patent Application Number 2018-173072 filed on Sep. 14, 2018, the entire content of which is hereby incorporated by reference.

BACKGROUND

1. Technical Field

The present disclosure relates to a head-mounted display and a control method thereof.

2. Description of the Related Art

A head-mounted display allows a user (hereinafter, also referred to as a "wearer") wearing the head-mounted display to become immersed in a video and a sound, but makes it difficult for the user to communicate with an outside person. To address this, conventionally, techniques have been proposed that facilitate communication between the wearer of the head-mounted display and an outside person (see Patent Literature (PTL) 1: WO 2014/156388).

SUMMARY

However, the technique disclosed in PTL 1 is problematic in that, although it is possible to facilitate communication between the wearer of the head-mounted display and an outside person to some extent, it is not possible to achieve smooth communication that allows the wearer and the outside person to understand their intentions with each other.

To address this, the present disclosure provides a head-mounted display that achieves smooth communication that allows a wearer of the head-mounted display and an outside person to understand their intentions with each other, and a control method of controlling the head-mounted display.

A head-mounted display according to one aspect of the present disclosure relates to a head-mounted display that presents a video. The head-mounted display includes: a sound receiver that receives a sound coming from a specific direction; a voice detector that detects a voice from the sound received by the sound receiver; a head movement detector that detects movement of a head of a wearer of the head-mounted display; an external display that displays externally visible information; and a response detector that, when the voice detector detects the voice and the head movement detector detects movement of the head of the wearer facing toward the specific direction, displays information indicating that the wearer has responded to the voice on the external display.

A control method of controlling a head-mounted display according to one aspect of the present disclosure relates to a control method of controlling a head-mounted display that presents a video. The control method includes: receiving a sound coming from a specific direction; detecting a voice from the sound received in the sound receiving; detecting movement of a head of a wearer of the head-mounted display; and when the voice is detected in the detecting of the voice, and movement of the head of the wearer facing toward the specific direction is detected in the detecting of the movement of the head, displaying information indicating that the wearer has responded to the voice on an external display that displays externally visible information.

A head-mounted display according to one aspect of the present disclosure relates to a head-mounted display that presents a video. The head-mounted display includes: a sound receiver that receives a sound coming from a specific direction; a voice detector that detects a voice from the sound received by the sound receiver; a body movement detector that detects an orientation of a body of a wearer of the head-mounted display; an external display that displays externally visible information; and a response detector that, when the voice detector detects the voice, and the body movement detector detects movement of the body of the wearer facing toward the specific direction, displays information indicating that the wearer has responded to the voice on the external display.

A control method of controlling a head-mounted display according to one aspect of the present disclosure relates to a control method of controlling a head-mounted display that presents a video. The control method includes: receiving a sound coming from a specific direction; detecting a voice from the sound received in the sound receiving; detecting an orientation of a body of a wearer of the head-mounted display; and when the voice is detected in the detecting of the voice, and movement of the body of the wearer facing toward the specific direction is detected in the detecting of the movement of the body, displaying information indicating that the wearer has responded to the voice on an external display that displays externally visible information.

A head-mounted display according to one aspect of the present disclosure relates to a head-mounted display that presents a video. The head-mounted display includes: a sound receiver that receives a sound coming from a specific direction; a voice detector that detects a voice from the sound received by the sound receiver; a hand/arm movement detector that detects movement of a hand or an arm of a wearer of the head-mounted display; an external display that displays externally visible information; and a response detector that, when the voice detector detects the voice, and the hand/arm movement detector detects a predetermined movement of the hand or the arm of the wearer, displays information indicating that the wearer has responded to the voice on the external display.

A control method of controlling a head-mounted display according to one aspect of the present disclosure relates to a control method of controlling a head-mounted display that presents a video. The control method includes: receiving a sound coming from a specific direction; detecting a voice from the sound received in the sound receiving; detecting movement of a hand or an arm of a wearer of the head-mounted display; and when the voice is detected in the detecting of the voice, and a predetermined movement of the hand or the arm of the wearer is detected in the detecting of the movement of the hand or the arm, displaying information indicating that the wearer has responded to the voice on an external display that displays externally visible information.

The generic or specific aspects of the present disclosure may be implemented by a system, a method, an integrated circuit, a computer program, or a computer readable recording medium such as a CD-ROM, or may be implemented by any combination of a system, a method, an integrated circuit, a computer program, and a recording medium.

According to the present disclosure, it is possible to provide a head-mounted display that achieves smooth communication that allows a wearer of the head-mounted display and an outside person to understand their intentions with each other, and a control method of controlling the head-mounted display.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
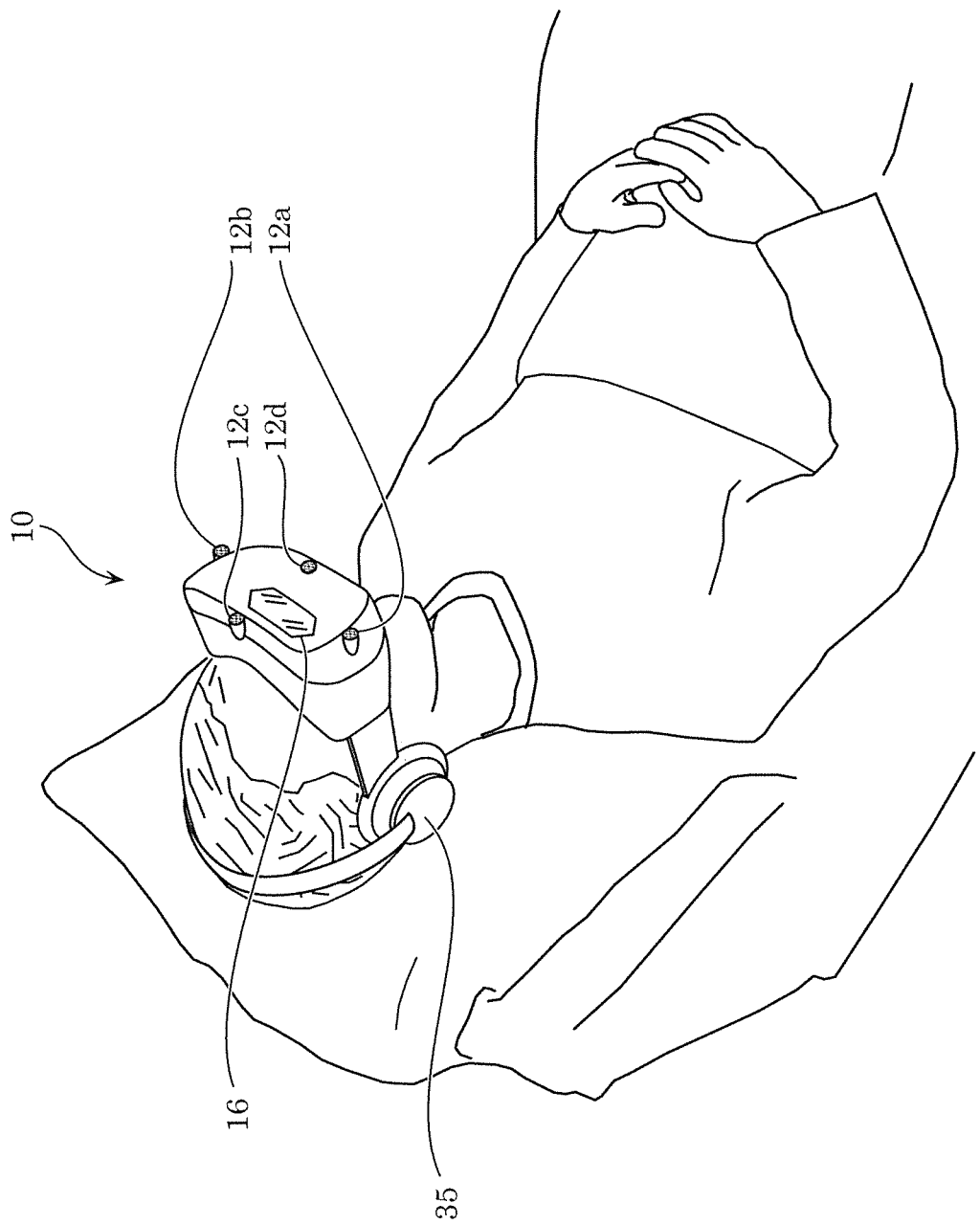
FIG. 1 is an external view of a head-mounted display according to an embodiment.

Underlying Knowledge Forming Basis of the Present Disclosure

A head-mounted display that is a display apparatus that is worn on the head of a user and allows the user to view and listen to a video and a sound has become widely available in recent years. The applications of the head-mounted display include, for example, use for on-board services in airplanes. Some airline companies offer on-board entertainment services using head-mounted displays to passengers.

A head-mounted display has a problem in that a passenger wearing the head-mounted display can become immersed in a video and a sound, but cannot easily communicate with an outside person. For example, it is not possible for a cabin attendant who is speaking to the passenger to know whether the passenger is aware of the cabin attendant.

A passenger wants to recognize a cabin attendant who is coming close while wearing a head-mounted display and have concise communication with the cabin attendant while viewing and listening to contents without removing the head-mounted display if possible. On the other hand, a cabin attendant wants to know whether a passenger to which the cabin attendant is speaking is aware of the cabin attendant.

As a technique for facilitating communication between the wearer of the head-mounted display and an outside person, PTL 1 proposes a technique in which a notification (a notification using a video and a sound) is provided to the wearer of the head-mounted display, and thereafter information indicating that the wearer has been notified is displayed on the outer side of the head-mounted display. Through the display, it is possible for an outside person to know that the wearer has been notified.

However, according to the technique disclosed in PTL 1, only the information indicating that the wearer of the head-mounted display has been notified is displayed on the outer side of the head-mounted display, and information indicating that the wearer of the head-mounted display has noticed the notification is not displayed on the outer side of the head-mounted display. For example, in the case where the wearer is notified using a sound, if the sound volume level of the content reproduced by the head-mounted display is high, the wearer does not notice the notification. Even in this case, with the technique disclosed in PTL 1, the information indicating that the wearer has been notified is displayed on the outer side of the head-mounted display. That is, with the technique disclosed in PTL 1, it is not possible for an outside person to know whether the wearer has noticed the notification.

Also, the technique disclosed in PTL 1 is based on the premise that the wearer of the head-mounted display unfailingly notices a notification. To ensure that the wearer notices a notification, in the case of visually notifying the wearer, an image or the like that is easily noticed by the wearer is displayed. As a result, the wearer is interrupted from viewing and listening to the content reproduced by the head-mounted display. On the other hand, in the case of audibly notifying the wearer, in order to provide a sound that is easily noticed by the wearer, processing is required such as temporarily muting or lowering the sound of the content reproduced by the head-mounted display. In this case as well, the wearer is interrupted from viewing and listening to the content reproduced by the head-mounted display.

Furthermore, with the technique disclosed in PTL 1, the intention of the wearer of the head-mounted display, or in other words, information indicating whether or not the wearer wants to communicate with an outside person, is not displayed on the outer side of the head-mounted display.

As described above, the technique disclosed in PTL 1 is problematic in in that, although it is possible to facilitate communication between the wearer of the head-mounted display and an outside person to some extent, it is not possible to achieve smooth communication that allows the wearer and the outside person to understand their intentions with each other.

To address this, the present disclosure provides a head-mounted display that achieves smooth communication that allows a wearer of the head-mounted display and an outside person to understand their intentions with each other, and a control method of controlling the head-mounted display.

For this purpose, in a head-mounted display according to one aspect of the present disclosure, the position (sound coordinates) of an outside person who speaks to a wearer of the head-mounted display is specified. Then, when movement of the head, the body, the hand or the arm of the wearer of the head-mounted display toward a direction of the sound coordinates is detected, it is determined that the wearer of the head-mounted display has responded to the voice of the outside person, and information indicating the fact is displayed on the outer side of the head-mounted display.

With this configuration, it is possible to recognize, from the outside, that the wearer of the head-mounted display has noticed the notification. Accordingly, the wearer of the head-mounted display can be notified while viewing and listening to the content in such a manner that the wearer is not interrupted from viewing and listening to the content, or in other words, it is possible to notify the wearer in a natural manner. Also, the intention of the wearer of the head-mounted display, or in other words, information indicating whether or not the wearer wants to communicate with an outside person is displayed on the outer side of the head-mounted display.

That is, according to the present disclosure, it is possible to implement a head-mounted display that achieves smooth communication that allows a wearer of the head-mounted display and an outside person to understand their intentions with each other.

More specifically, a head-mounted display according to one aspect of the present disclosure relates to a head-mounted display that presents a video, the head-mounted display including: a sound receiver that receives a sound coming from a specific direction; a voice detector that detects a voice from the sound received by the sound receiver; a head movement detector that detects movement of a head of a wearer of the head-mounted display; an external display that displays externally visible information; and a response detector that, when the voice detector detects the voice and the head movement detector detects movement of the head of the wearer facing toward the specific direction, displays information indicating that the wearer has responded to the voice on the external display.

With this configuration, when movement of the head of the wearer of the head-mounted display toward the specific direction, which is set to be the sound source direction from which the voice of the outside person is coming, is detected, information indicating that the wearer has responded to the voice is displayed on the external display. Accordingly, when the wearer indicates his/her intention to respond to the voice of the outside person, the intention is displayed on the external display. Accordingly, it is possible to achieve smooth communication that allows the wearer and the outside person to understand their intentions with each other.

Here, the head-mounted display may further include a speaking person identifier that determines whether or not the voice detected by the voice detector is a voice of a predetermined speaking person, and the response detector may display the information on the external display when the speaking person identifier determines that the voice is the voice of the predetermined speaking person, and the head movement detector detects the movement of the head of the wearer facing toward the specific direction.

With this configuration, when the wearer of the head-mounted display indicates his/her intention to respond to the voice of a predetermined speaking person, the intention is displayed on the external display. Accordingly, a misrecognition in which the wearer responds to the voice of an irrelevant person, which is noise heard by the wearer, is suppressed, as a result of which the accuracy of response of the head-mounted display is improved.

Also, the head-mounted display may further include a sound source locator that locates a sound source, and the sound receiver may receive a sound coming from a direction of the sound source located by the sound source locator as the sound coming from the specific direction.

With this configuration, the sound source direction is located by the sound source locator, and it is therefore unnecessary to fix the voice of the outside person to the voice coming from the specific direction. That is, when the wearer responds to a voice coming from any direction, information indicating the fact is displayed on the external display, as a result of which the usability of the head-mounted display is improved.

Also, the head-mounted display may further include: a headphone set that emits a sound associated with the video to the wearer; and a voice superimposer that superimposes the voice detected by the voice detector on the sound associated with the video, and outputs a resultant to the headphone set.

With this configuration, the voice of the outside person is superimposed on the sound associated with the video, and then output through the headphone set. Accordingly, the wearer of the head-mounted display can also hear the voice of the outside person while listening to the sound of the reproduced content, as a result of which it is possible to achieve further smooth communication between the wearer and the outside person.

Also, the voice superimposer may perform sound localization to cause the voice detected by the voice detector to be heard from a direction corresponding to the specific direction, and then superimpose the voice detected by the voice detector on the sound associated with the video.

With this configuration, through the sound localization, the wearer of the head-mounted display can hear the voice of the outside person from the actual sound source direction, or a sound source direction corresponding to the actual sound source direction, and thus can easily recognize the direction in which the outside person who emitted the voice is present, as in the case where the wearer is not wearing the head-mounted display.

Also, the head-mounted display may further include a headphone set that emits a sound associated with the video to the wearer, and the response detector may lower a sound volume level of the sound emitted by the headphone set when the information is displayed on the external display.

With this configuration, when the outside person emits his/her voice toward the wearer, the sound volume level of the sound emitted by the headphone set is lowered. Accordingly, the wearer of the head-mounted display can hear the voice of the outside person while wearing the head-mounted display.

Also, when the voice detector detects the voice, and the head movement detector detects the movement of the head of the wearer facing toward the specific direction, the response detector may control the sound receiver to change a sound receiving direction to cause the sound receiver to receive a voice of the wearer.

With this configuration, after the wearer has responded to the voice of the outside person by moving the face of the wearer toward the outside person, the sound receiving direction is changed so as to receive the voice of the wearer. Accordingly, the voice of the wearer emitted thereafter is received, as a result of which it is possible to achieve further smooth communication between the wearer and the outside person.

Another aspect of the present disclosure relates to a control method of controlling a head-mounted display. The control method is a control method of controlling a head-mounted display that presents a video, the control method including: receiving a sound coming from a specific direction; detecting a voice from the sound received in the sound receiving; detecting movement of a head of a wearer of the head-mounted display; and when the voice is detected in the detecting of the voice, and movement of the head of the wearer facing toward the specific direction is detected in the detecting of the movement of the head, displaying information indicating that the wearer has responded to the voice on an external display that displays externally visible information.

Also, a head-mounted display according to one aspect of the present disclosure relates to a head-mounted display that presents a video, the head-mounted display including: a sound receiver that receives a sound coming from a specific direction; a voice detector that detects a voice from the sound received by the sound receiver; a body movement detector that detects an orientation of a body of a wearer of the head-mounted display; an external display that displays externally visible information; and a response detector that, when the voice detector detects the voice, and the body movement detector detects movement of the body of the wearer facing toward the specific direction, displays information indicating that the wearer has responded to the voice on the external display.

With this configuration, when movement of the body of the wearer of the head-mounted display toward the specific direction, which is set to be the sound source direction from which the voice of the outside person is coming, is detected, information indicating that the wearer has responded to the voice is displayed on the external display. Accordingly, when the wearer indicates his/her intention to respond to the voice of the outside person, the intention is displayed on the external display, and it is therefore possible to achieve smooth communication that allows the wearer and the outside person to understand their intentions with each other.

Another aspect of the present disclosure relates to a control method of controlling a head-mounted display. The control method is a control method of controlling a head-mounted display that presents a video, the control method including: receiving a sound coming from a specific direction; detecting a voice from the sound received in the sound receiving; detecting an orientation of a body of a wearer of the head-mounted display; and when the voice is detected in the detecting of the voice, and movement of the body of the wearer facing toward the specific direction is detected in the detecting of the movement of the body, displaying information indicating that the wearer has responded to the voice on an external display that displays externally visible information.

Also, a head-mounted display according to one aspect of the present disclosure relates to a head-mounted display that presents a video, the head-mounted display including: a sound receiver that receives a sound coming from a specific direction; a voice detector that detects a voice from the sound received by the sound receiver; a hand/arm movement detector that detects movement of a hand or an arm of a wearer of the head-mounted display; an external display that displays externally visible information; and a response detector that, when the voice detector detects the voice, and the hand/arm movement detector detects a predetermined movement of the hand or the arm of the wearer, displays information indicating that the wearer has responded to the voice on the external display.

With this configuration, when a predetermined movement of the hand or the arm of the wearer of the head-mounted display is detected, information indicating that the wearer has responded to the voice is displayed on the external display. Accordingly, when the wearer indicates his/her intention to respond to the voice of the outside person, the intention is displayed on the external display, and it is therefore possible to achieve smooth communication that allows the wearer and the outside person to understand their intentions with each other.

Another aspect of the present disclosure relates to a control method of controlling a head-mounted display. The control method is a control method of controlling a head-mounted display that presents a video, the control method including: receiving a sound coming from a specific direction; detecting a voice from the sound received in the sound receiving; detecting movement of a hand or an arm of a wearer of the head-mounted display; and when the voice is detected in the detecting of the voice, and a predetermined movement of the hand or the arm of the wearer is detected in the detecting of the movement of the hand or the arm, displaying information indicating that the wearer has responded to the voice on an external display that displays externally visible information.

Also, another aspect of the present disclosure relates to a program that is executed by a CPU, a processor or a computer, or a computer-readable recording medium, such as a disk or a semiconductor memory, in which the program is recorded. The program includes the steps that constitute the control methods of controlling a head-mounted display described above.

Hereinafter, the embodiment will be described in detail with reference to the accompanying drawings. The embodiment described below shows a generic or specific example of the present disclosure. Accordingly, the numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements. In addition, the diagrams are schematic representations, and thus are not necessarily true to scale. In the diagrams, structural elements that are substantially the same are given the same reference numerals, and a redundant description will be omitted or simplified.

Embodiment

FIG. 1 is an external view of head-mounted display 10 according to an embodiment. Head-mounted display 10 is a head-mounted display that allows a wearer of head-mounted display 10 to perform smooth communication with an outside person such that the wearer and the outside person can understand their intentions with each other while the wearer is wearing head-mounted display 10. Head-mounted display 10 includes microphones 12a to 12d, external display 16, and headphone set 35 as externally visible structural elements.

Microphones 12a to 12d are microphones that detect a sound source direction of a sound coming from the front side of head-mounted display 10, and are provided at four locations (upper, lower, right, and left locations) on the front surface of head-mounted display 10. Note that head-mounted display 10 does not necessarily require four microphones, and it is possible to provide, for example, two microphones so as to be spaced apart from each other in either the up-down direction or the right-left direction.

External display 16 is a display that displays externally visible information, and may be, for example, a lamp such as an LED, or a two-dimensional display such as an LCD display. As used herein, "externally visible information" may be a simple illumination of a lamp, or characters, signs, icons, images, or any combination of at least two of the above.

Headphone set 35 is a headphone set that emits the sound associated with a video provided by head-mounted display 10 to the wearer. Headphone set 35 may be an open-air type or closed type headphone set. In the present embodiment, headphone set 35 is preferably an open-air type headphone set so that the sound associated with a video reproduced by head-mounted display 10 is output, and that the wearer of head-mounted display 10 can also hear the voice of an outside person.

Figure 2:
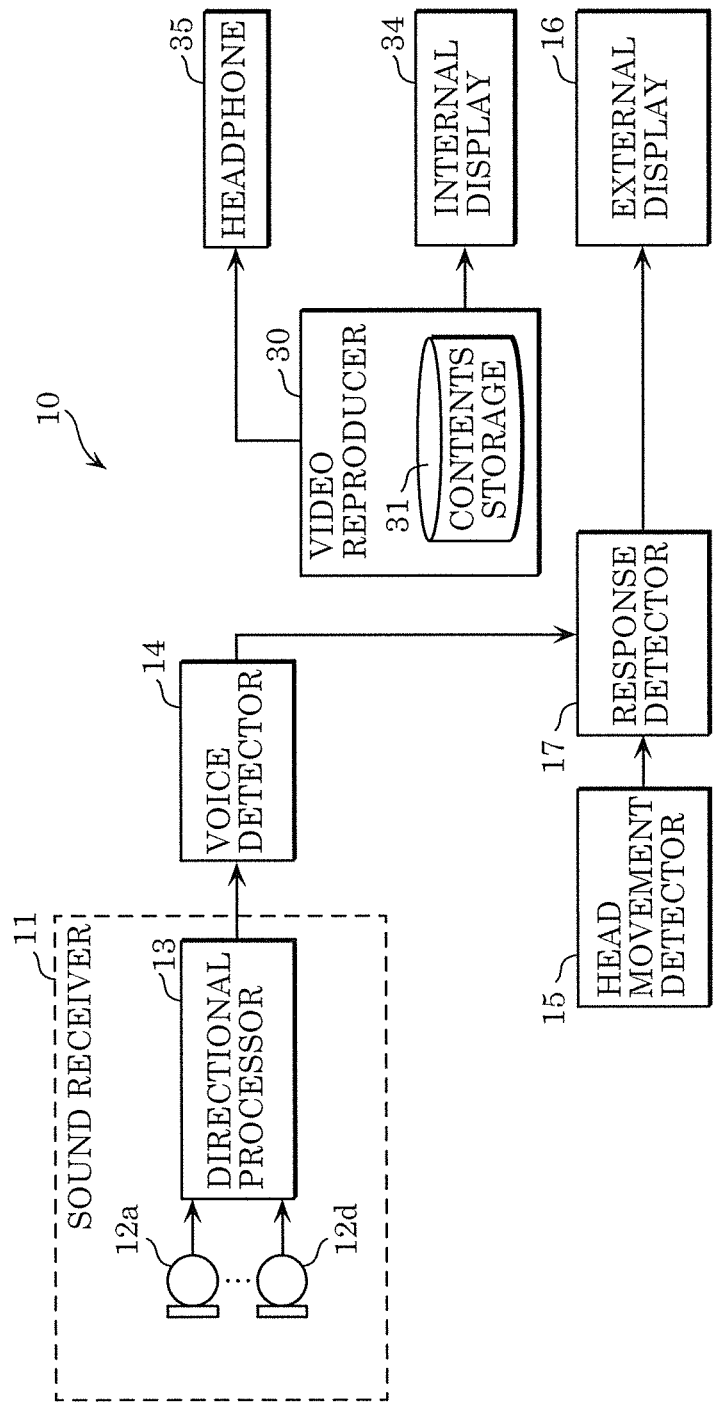
FIG. 2 is a block diagram showing a configuration of the head-mounted display shown in FIG. 1.

FIG. 2 is a block diagram showing a configuration of head-mounted display 10 shown in FIG. 1. Head-mounted display 10 includes sound receiver 11, voice detector 14, head movement detector 15, external display 16, response detector 17, video reproducer 30, internal display 34, and headphone set 35.

Sound receiver 11 is a processor that is configured to receive a sound coming from a specific direction, and includes four microphones 12a to 12d, and directional processor 13. Directional processor 13 receives only the sound coming from the specific direction by performing signal processing on the sound signals output from four microphones 12a to 12d. Examples of the signal processing include: a delay beamforming method in which the sound coming from the specific direction is emphasized by delaying the sound signals output from four microphones 12a to 12d; and an adaptive beamforming method in which a sound coming from a specific direction and unnecessary sounds coming from the other directions are generated through the delay beamforming method, and the unnecessary sounds coming from the other directions are removed from the sound coming from the specific direction. Alternatively, a method may be used in which the sound coming from the specific direction is received using one unidirectional microphone. Alternatively, a method may be used in which a plurality of unidirectional microphones that receive sounds coming from different directions are prepared, and only a unidirectional microphone that corresponds to the specific direction is selected.

As used herein, "specific direction" refers to, in the case where the positional relationship between a wearer of head-mounted display 10 and an outside person who is speaking to the wearer is identified to some extent, such as, for example, in the case where a situation takes place between a passenger wearing head-mounted display 10 and a cabin attendant in an airplane, a predetermined fixed direction (for example, a diagonally upper forward direction on the aisle side). However, "specific direction" is not limited to the fixed direction, and may be a direction that is dynamically changed by an external instruction.

Also, the number of microphones that constitute sound receiver 11 is not limited to four. For example, sound receiver 11 may include three or more microphones to receive the sound coming from the specific direction.

Voice detector 14 is a processor that is configured to detect a voice from the sound received by the sound received by sound receiver 11. For example, in the signal output from sound receiver 11, if power in the voice frequency band exceeds a threshold value for a predetermined length of time, it is determined that the signal output from sound receiver 11 indicates a voice, and response detector 17 is notified of the fact that a voice has been detected.

Head movement detector 15 is a sensor that detects movement of the head of the wearer of head-mounted display 10, and outputs a signal indicating the result of detection to response detector 17, and may include, for example, at least one of a gyroscope and an acceleration sensor. Head movement detector 15 may detect the movement of the head by detecting a line of sight of the wearer by using a camera or the like.

Response detector 17 is a processor that is configured to, when voice detector 14 detects the voice, and head movement detector 15 detects the movement of the head of the wearer facing toward the specific direction from which sound receiver 11 receives the sound, display information indicating that the wearer has responded to the voice on external display 16. As used herein, "movement of the head of the wearer facing toward the specific direction" means that the wearer turns his/her face toward the specific direction.

Internal display 34 is a display that presents a video to the wearer of head-mounted display 10. Internal display 34 may be, for example, a three-dimensional video panel.

Video reproducer 30 is a processor that includes contents storage 31 that stores contents, and is configured to read a content from contents storage 31 and reproduce the content in accordance with an instruction from the wearer via a remote controller (not shown) or the like, and output a video signal to internal display 34 and a sound signal associated with the video to headphone set 35. Video reproducer 30 may be, for example, a processor including a video decoder and a program.

Directional processor 13, voice detector 14, and response detector 17 are typically implemented with software by a system circuit or a microcomputer that includes a ROM that stores a program, a RAM, a processor that executes the program, an input/output circuit for connecting to a peripheral circuit, and the like. However, the structural elements may be implemented with hardware by dedicated logic circuits such as ASICs or gate arrays that implement respective processing operations.

Next is a description of operations performed by head-mounted display 10 according to the present embodiment configured as described above.

Figure 3:
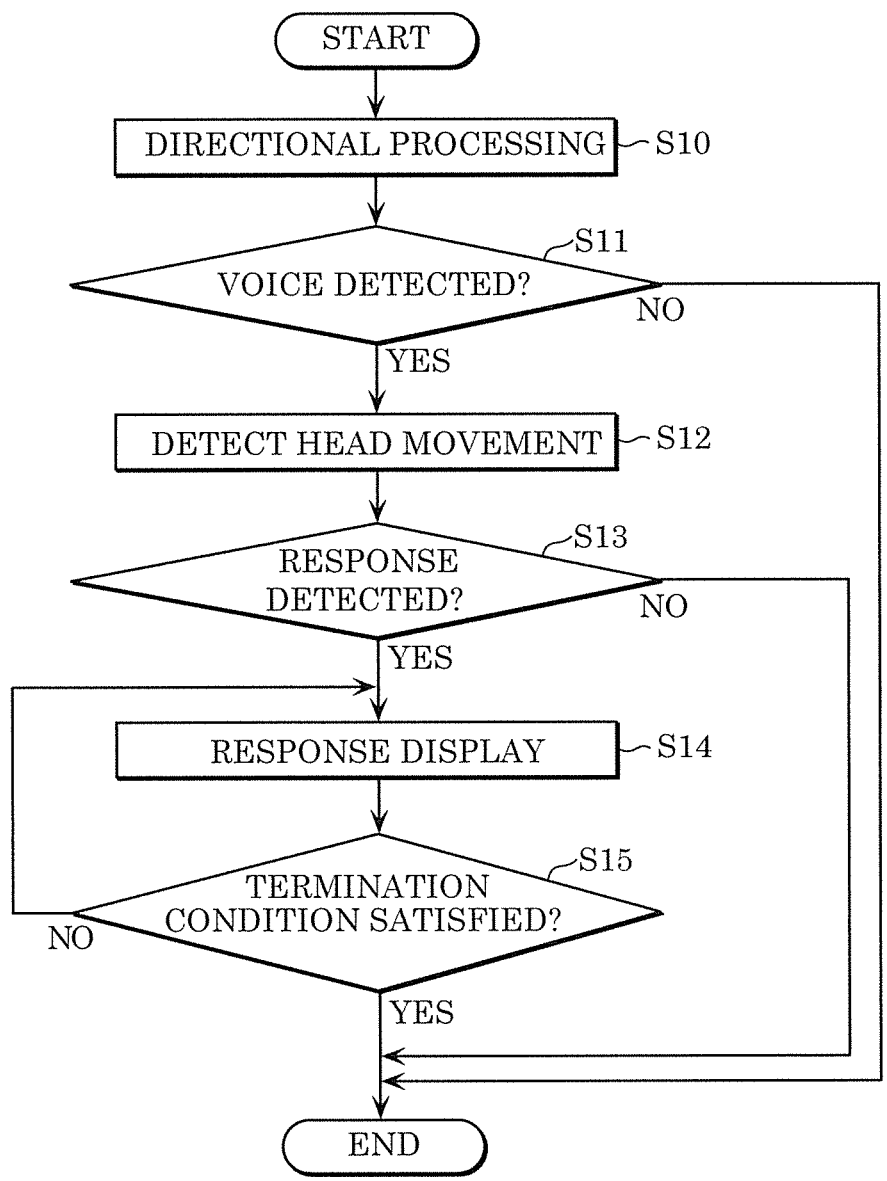
FIG. 3 is a flowchart illustrating operations performed by a head-mounted display according to an embodiment.

FIG. 3 is a flowchart illustrating operations performed by head-mounted display 10 (or in other words, a control method of controlling head-mounted display 10) according to the present embodiment. It is assumed here that an airplane passenger wearing head-mounted display 10 is watching a reproduced content while sitting on a seat.

First, sound receiver 11 receives a sound coming from a specific direction (sound receiving step S10). To be specific, directional processor 13 receives only the sound coming from the specific direction (a diagonally upper forward direction in this example) by performing signal processing such as delay beamforming on the sound signals output from four microphones 12a to 12d.

Next, voice detector 14 detects a voice from the sound received by sound receiver 11 (voice detection step S11). To be specific, in the signal output from sound receiver 11, if the power in the voice frequency band exceeds a threshold value for a predetermined length of time, voice detector 14 determines that the signal output from sound receiver 11 indicates a voice, and notifies response detector 17 of the fact that a voice has been detected. In response thereto, response detector 17 determines whether or not a voice coming from the diagonally upper forward direction has been detected, or in other words, whether or not a cabin attendant has spoken to the wearer of head-mounted display 10.

If it is determined that a voice has been detected by voice detector 14 (YES in S11), response detector 17 advances the processing to step S12. Otherwise (NO in S11), the processing ends.

Head movement detector 15 detects movement of the head of the wearer of head-mounted display 10, and outputs a signal indicating the result of detection to response detector 17 (head movement detection step S12).

Response detector 17 analyzes the signal output from head movement detector 15, and thereby determines whether or not the wearer (a passenger in this example) of head-mounted display 10 has responded to the speech of the cabin attendant (S13).

To be specific, if it is determined that head movement detector 15 has detected movement of the head of the wearer facing toward the specific direction from which sound receiver 11 receives the sound (YES in S13), response detector 17 determines that the wearer has responded to the speech of the cabin attendant, and displays information indicating that the wearer has responded to the voice on external display 16 (response detection step S14).

After that, response detector 17 determines whether or not a processing termination condition has been satisfied (S15), and continues to display the information indicating that the wearer has responded to the voice on external display 16 until the processing termination condition has been satisfied. As used herein, "processing termination condition" refers to the situation where the wearer no longer responds to the voice. For example, the processing termination condition may be the situation where head movement detector 15 no longer detects the movement of the head of the wearer facing toward the specific direction from which sound receiver 11 receives the sound.

On the other hand, if it is determined that head movement detector 15 has not detected movement of the head of the wearer facing toward the specific direction from which sound receiver 11 receives the sound (NO in S13), response detector 17 determines that the wearer did not respond to the speech of the cabin attendant, and the processing ends.

As described above, head-mounted display 10 according to the present embodiment is a head-mounted display that presents a video, and includes sound receiver 11 that receives a sound coming from a specific direction, voice detector 14 that detects a voice from the sound received by sound receiver 11, head movement detector 15 that detects movement of the head of the wearer of head-mounted display 10, external display 16 that displays externally visible information, and response detector 17 that, when voice detector 14 detects the voice, and head movement detector 15 detects movement of the head of the wearer facing toward the specific direction, displays information indicating that the wearer has responded to the voice on external display 16.

The control method of controlling head-mounted display 10 according to the present embodiment is a control method of controlling head-mounted display 10 that presents a video, and the control method includes sound receiving step S10 of receiving a sound coming from a specific direction, voice detection step S11 of detecting a voice from the sound received in sound receiving step S10, head movement detection step S12 of detecting movement of the head of the wearer of head-mounted display 10, and response detection step S14 of, when the voice is detected in voice detection step S11, and movement of the head of the wearer facing toward the specific direction is detected in head movement detection step S12, displaying information indicating that the wearer has responded to the voice on external display 16 that displays externally visible information.

With this configuration, when movement of the face of the wearer of head-mounted display 10 toward the specific direction, which is set to be the sound source direction from which the voice of the outside person is coming, is detected, information indicating that the wearer has responded to the voice is displayed on external display 16. Accordingly, when the wearer indicates his/her intention to respond to the voice of the outside person, the intention is displayed on external display 16. Accordingly, it is possible to achieve smooth communication that allows the wearer and the outside person to understand their intentions with each other.

In the present embodiment, in the flowchart shown in FIG. 3, the head movement detection (S12) is performed after the directional processing (S10) and the voice detection (S11), but the order of performing the processing operations is not limited thereto. The head movement detection (S12) may be performed prior to the directional processing (S10) and the voice detection (S11), or the processing operations may be performed in parallel.

Variation 1

Next, head-mounted display according to Variation 1 of the embodiment will be described.

Figure 4:
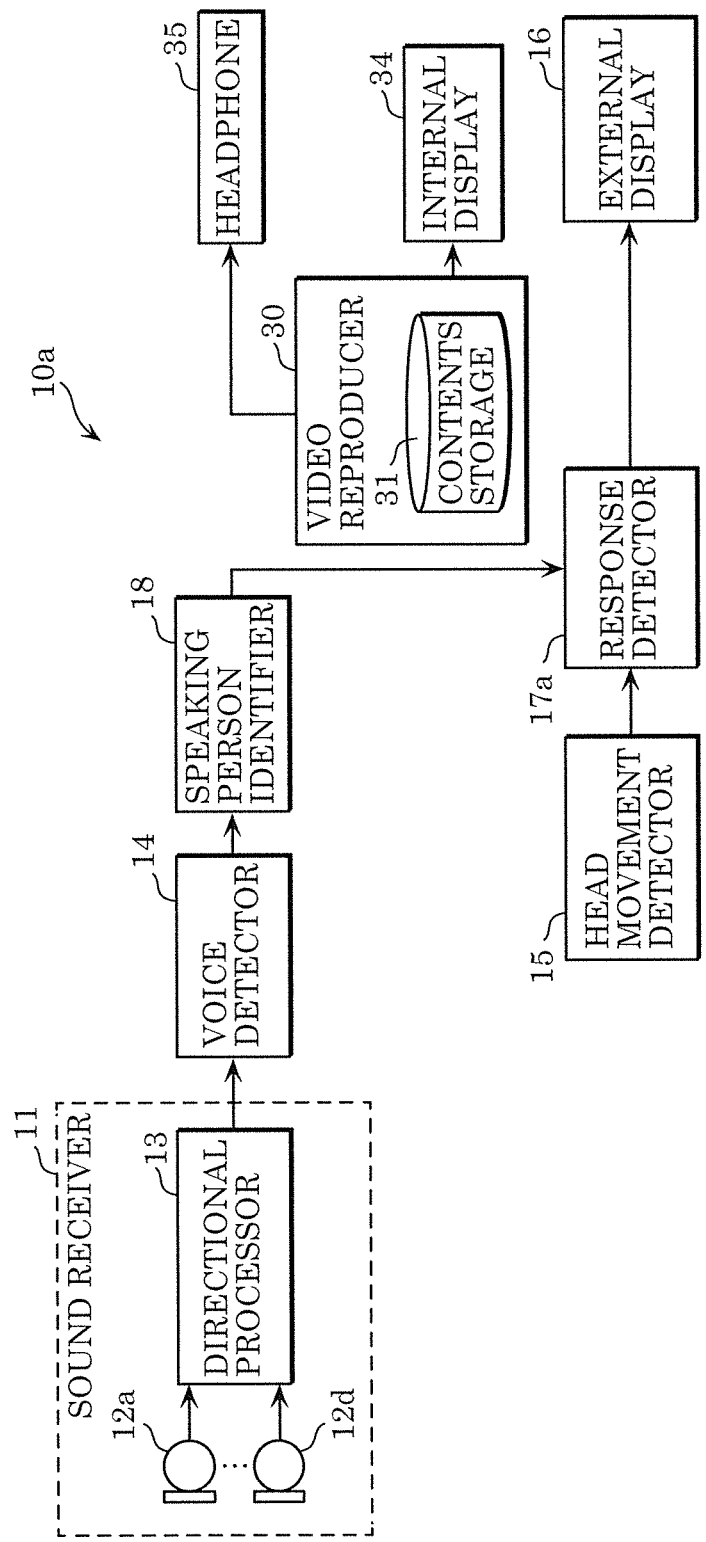
FIG. 4 is a block diagram showing a configuration of a head-mounted display according to Variation 1 of the embodiment.

FIG. 4 is a block diagram showing a configuration of head-mounted display 10a according to Variation 1 of the embodiment. Head-mounted display 10a is a head-mounted display that has a function of identifying a speaking person, and includes sound receiver 11, voice detector 14, speaking person identifier 18, head movement detector 15, external display 16, response detector 17a, video reproducer 30, internal display 34, and headphone set 35.

Head-mounted display 10a according to the present variation basically has the same configuration as that of head-mounted display 10 according to the embodiment, but is different from the embodiment in that the present variation includes speaking person identifier 18 as an additional structural element and response detector 17a according to the variation. Hereinafter, the present variation will be described focusing on the difference from the embodiment.

Speaking person identifier 18 is a processor that is configured to determine whether or not the voice detected by voice detector 14 is the voice of a predetermined speaking person, and notifies response detector 17a of the result of detection. In the present variation, speaking person identifier 18 includes a storage in which the voices of cabin attendants and the like are registered in advance, and determines whether or not the voice detected by voice detector 14 matches any one of the voices registered in the storage.

For example, speaking person identifier 18 extracts a feature value of the speaking person by using i-vector, and identifies the speaking person (Non-Patent Literature (NPL 1): Study on i-vector based speaker identification for short utterances, by Misaki Tsujikawa, et al., IEICE Technical Report, vol. 115, No. 99, SP 2015-12, pp. 65-70, June, 2015). That is, the voice is converted to a multidimensional feature value vector by speaking person identifier 18. A newly input voice is also converted to a feature value vector, and it is determined whether or not the input voice is the voice of a cabin attendant by determining whether or not the input voice is similar to any one the registered feature value vectors.

Speaking person identifier 18 is typically implemented with software by a system circuit or a microcomputer that includes a ROM that stores a program, a RAM, a processor that executes the program, an input/output circuit for connecting to a peripheral circuit, and the like. However, the structural element may be implemented with hardware by a dedicated logic circuit such as an ASIC or a gate array that implements the processing operations.

Response detector 17a basically has the same function as that of response detector 17 according to the embodiment. In the present variation, when speaking person identifier 18 determines that the voice is the voice of a predetermined speaking person, and head movement detector 15 detects movement of the head of the wearer facing toward the specific direction, response detector 17a displays information indicating that the wearer has responded to the voice on external display 16.

Figure 5:
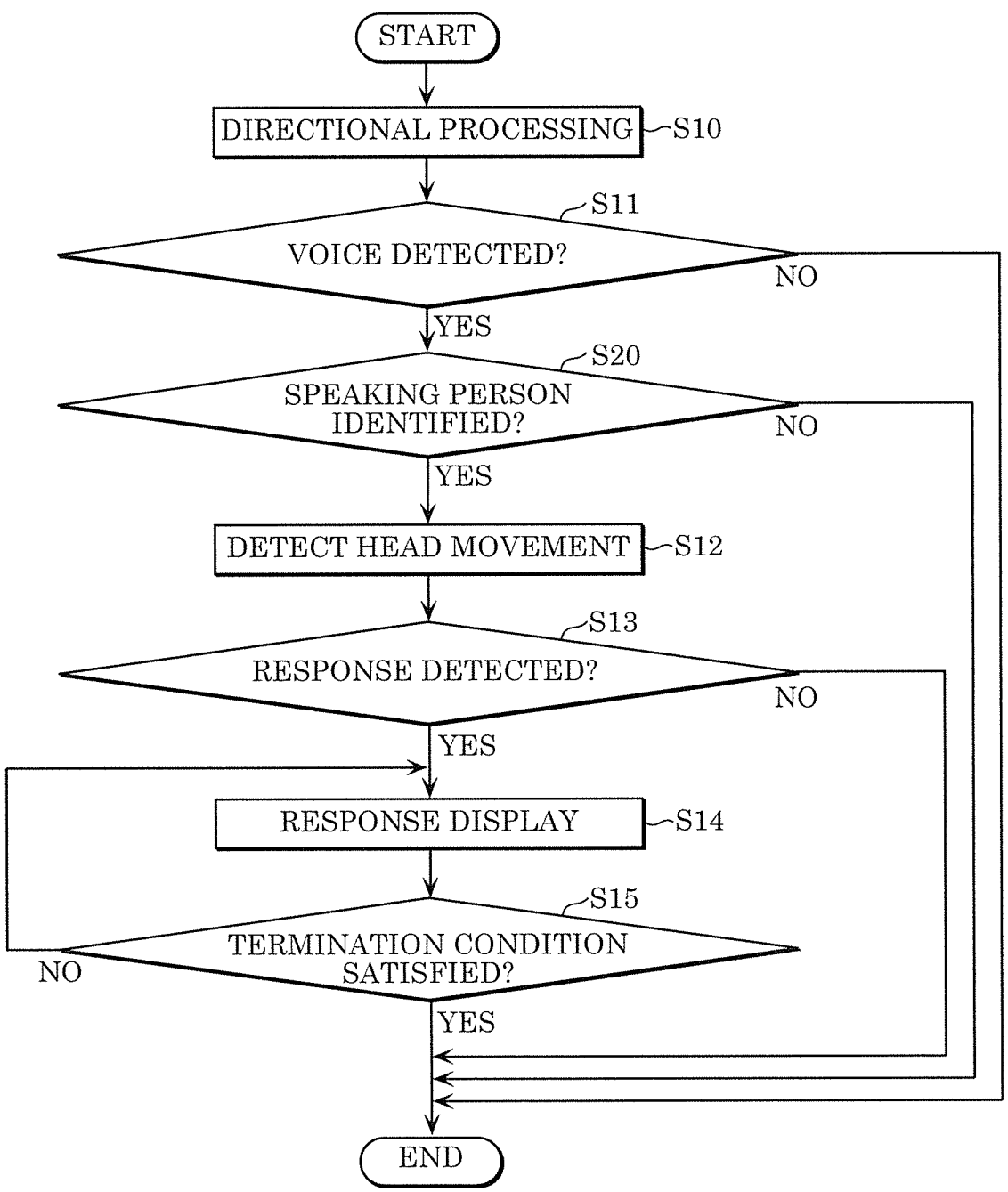
FIG. 5 is a flowchart illustrating operations performed by the head-mounted display according to Variation 1 of the embodiment.

FIG. 5 is a flowchart illustrating operations performed by head-mounted display 10a (or in other words, a control method of controlling head-mounted display 10a) according to the present variation. The operations are basically the same as those of the flowchart according to the embodiment shown in FIG. 3, but the present variation is different from the embodiment in that step S20 is added. Hereinafter, the present variation will be described focusing on the difference from the embodiment.

If it is determined that a voice has been detected by voice detector 14 (YES in S11), speaking person identifier 18 determines whether or not the voice detected by voice detector 14 is the voice of a predetermined speaking person, and notifies response detector 17a of the result of determination (S20). To be specific, speaking person identifier 18 determines whether or not the feature value vector of the voice input via voice detector 14 is similar to any one of the feature value vectors of the voices of cabin attendants registered in advance, and notifies response detector 17a of the result of determination.

If response detector 17a receives a notification indicating that the input voice is the voice of a predetermined speaking person (a cabin attendant in this example) from speaking person identifier 18 (YES in S20), response detector 17a advances the processing to step S12. Otherwise (NO in S20), the processing ends.

In step S12 and the subsequent steps, if it is determined that head movement detector 15 has detected movement of the head of the wearer facing toward the specific direction from which sound receiver 11 receives the sound (YES in S13), response detector 17a determines that the wearer has responded to the speech of the cabin attendant, and displays information indicating that the wearer has responded to the voice on external display 16 (response detection step S14), which is the same as that of embodiment.

As described above, head-mounted display 10a according to the present variation includes, in addition to the structural elements of the embodiment, speaking person identifier 18 that determines whether or not the voice detected by voice detector 14 is the voice of a predetermined speaking person. When speaking person identifier 18 determines that the voice is the voice of a predetermined speaking person (S20), and head movement detector 15 detects movement of the head of the wearer facing toward the specific direction (S13), response detector 17a displays information indicating that the wearer has responded to the voice on external display 16.

With this configuration, when the wearer of head-mounted display 10a indicates his/her intention to respond to the voice of a predetermined speaking person, the intention is displayed on external display 16. Accordingly, a misrecognition in which the wearer responds to the voice of an irrelevant person, which is noise heard by the wearer, is suppressed, as a result of which the accuracy of response of head-mounted display 10a is improved.

Variation 2

Next, a head-mounted display according to Variation 2 of the embodiment will be described.

Figure 6:
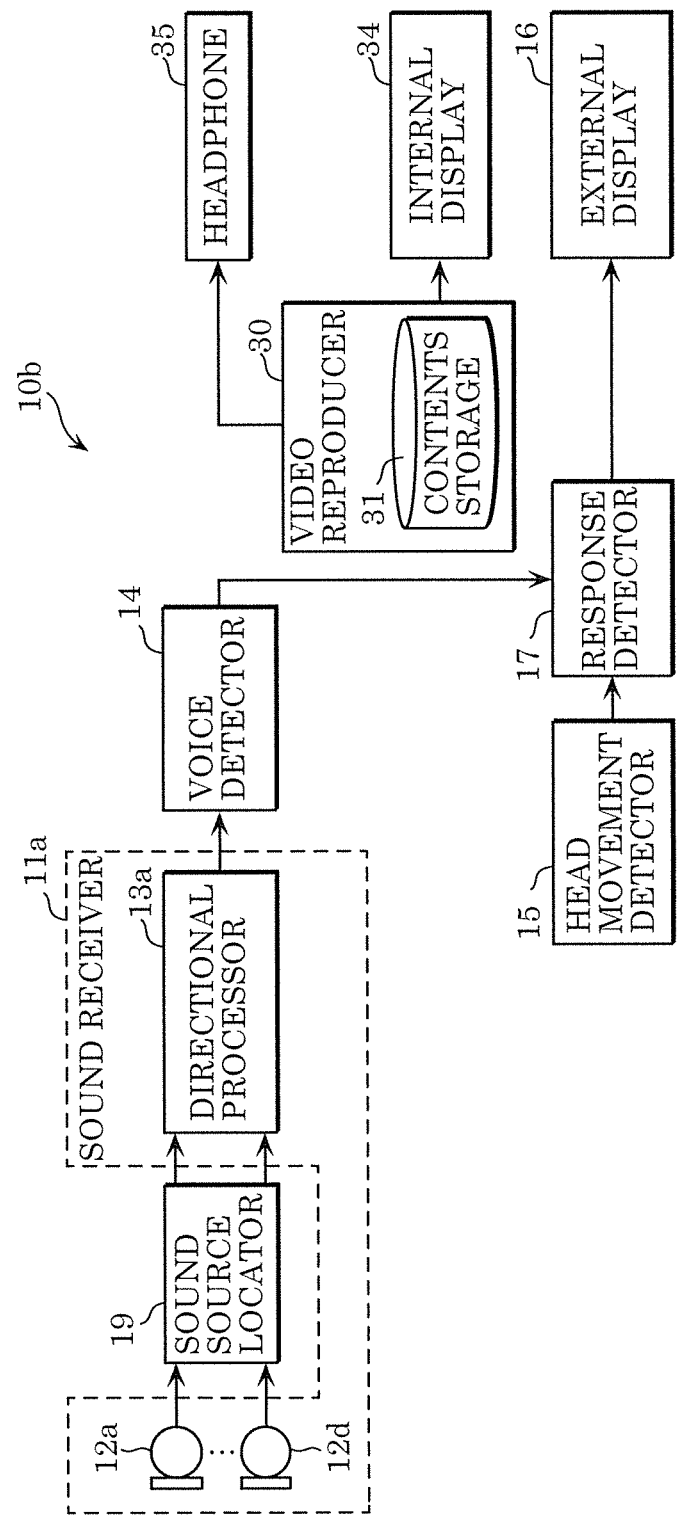
FIG. 6 is a block diagram showing a configuration of a head-mounted display according to Variation 2 of the embodiment.

FIG. 6 is a block diagram showing a configuration of head-mounted display 10b according to Variation 2 of the embodiment. Head-mounted display 10b is a head-mounted display that has a function of locating a sound source, and includes sound receiver 11a, voice detector 14, head movement detector 15, external display 16, response detector 17, sound source locator 19, video reproducer 30, internal display 34, and headphone set 35.

Head-mounted display 10b according to the present variation basically has the same configuration as that of head-mounted display 10 according to the embodiment, but is different from the embodiment in that the present variation includes sound source locator 19 as an additional structural element and sound receiver 11a according to the variation. Hereinafter, the present variation will be described focusing on the difference from the embodiment.

Sound source locator 19 is a processor that is configured to locate a sound source. To be specific, sound source locator 19 locates the direction or position (coordinates in a three-dimensional space) of a sound of the surroundings by using four microphones 12a to 12d. For example, sound source locator 19 identifies a sound source direction on a plane that includes two microphones provided to be spaced apart from each other based on a difference of times at which the same sound arrives at each of the two microphones. Alternatively, sound source locator 19 pairs two microphones provided to be spaced apart from each other, and identifies a point of intersection of the two sound source directions as the position of the sound source by using two pairs of microphones aligned in different directions.

Sound source locator 19 is typically implemented with software by a system circuit or a microcomputer that includes a ROM that stores a program, a RAM, a processor that executes the program, an input/output circuit for connecting to a peripheral circuit, and the like. However, the structural element may be implemented with hardware by a dedicated logic circuit such as an ASIC or a gate array that implements the processing operations.

Sound receiver 11a receives a sound coming from the sound source direction of the sound source located by sound source locator 19 as the sound coming from the specific direction. To be specific, directional processor 13a that constitutes sound receiver 11a receives only the sound coming from the sound source direction of the sound source located by sound source locator 19 by performing, on the sound signals output from four microphones 12a to 12d, signal processing for receiving only the sound coming from the sound source direction of the sound source located by sound source locator 19. The signal processing is, for example, the same processing as that of sound receiver 11 of the embodiment.

Figure 7:
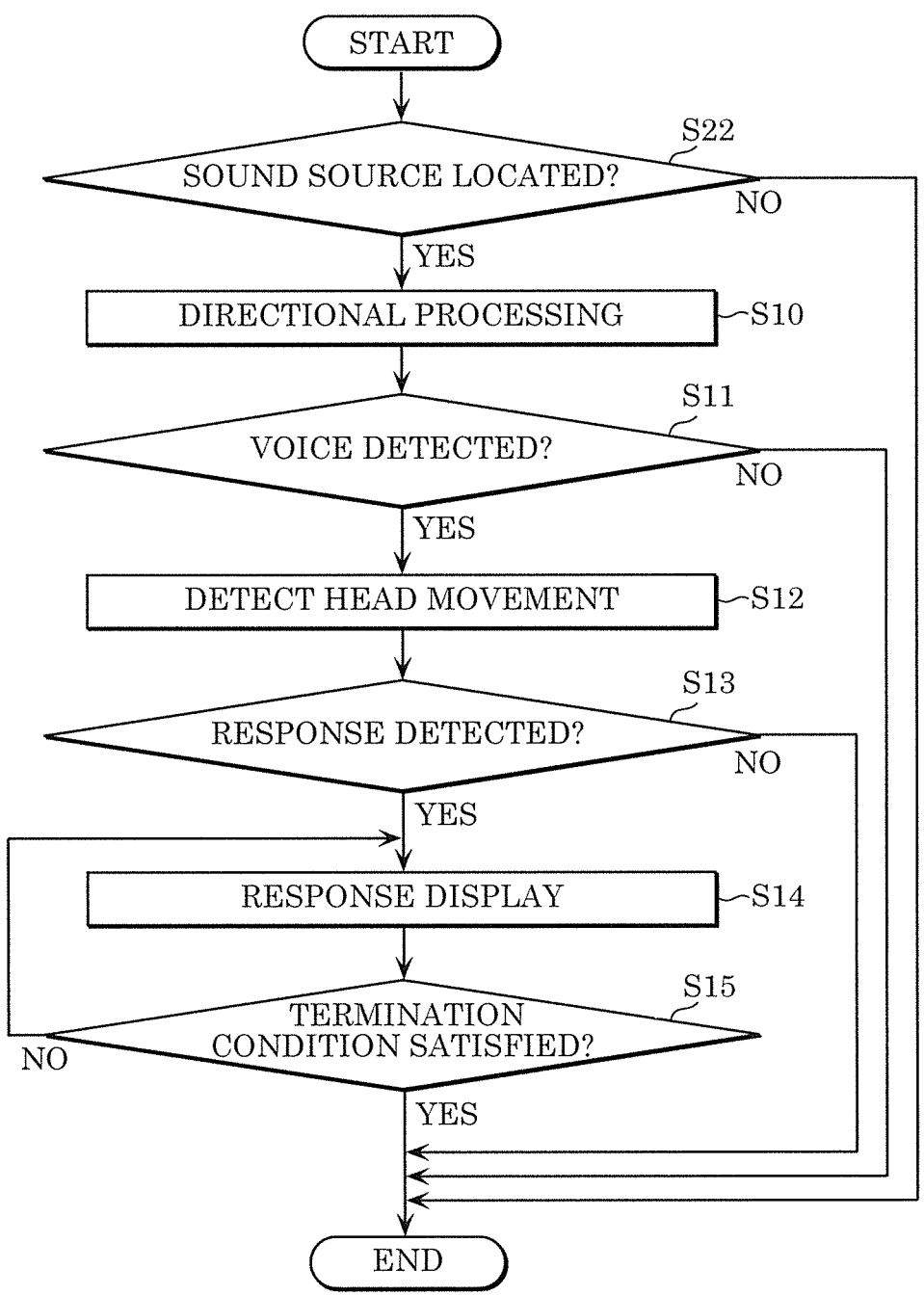
FIG. 7 is a flowchart illustrating operations performed by the head-mounted display according to Variation 2 of the embodiment.

FIG. 7 is a flowchart illustrating operations performed by head-mounted display 10b (or in other words, a control method of controlling head-mounted display 10b) according to the present variation. The operations are basically the same as those of the flowchart according to the embodiment shown in FIG. 3, but the present variation is different from the embodiment in that step S22 is added. Hereinafter, the present variation will be described focusing on the difference from the embodiment.

Prior to the directional processing (S10) performed by directional processor 13a, sound source locator 19 locates a sound source (S22). For example, sound source locator 19 locates the position (coordinates in a three-dimensional space) of a sound source by using four microphones 12a to 12d. If a sound source is not located (NO in S22), the processing ends.

On the other hand, if a sound source is located (YES in S22), directional processor 13a of sound receiver 11a receives a sound coming from a direction of the position of the sound source located by sound source locator 19 as the sound coming from the specific direction (S10). To be specific, directional processor 13a receives only the sound coming from the sound source direction of the sound source located by sound source locator 19 by performing, on the sound signals output from four microphones 12a to 12d, signal processing for receiving only the sound coming from the sound source direction of the sound source located by sound source locator 19. The processing in the subsequent steps (from step S11 to the last step) is the same as that of the embodiment.

As described above, head-mounted display 10b according to the present variation includes, in addition to the structural elements of the embodiment, sound source locator 19 that locates a sound source. Sound receiver 11a receives a sound coming from the sound source direction of the sound source located by sound source locator 19 as the sound coming from the specific direction.

With this configuration, the sound source direction is located by sound source locator 19, and it is therefore unnecessary to fix the voice of the outside person to the voice coming from the specific direction. That is, when the wearer responds to a voice coming from any direction, information indicating the fact is displayed on external display 16, as a result of which the usability of head-mounted display 10b is improved.

Variation 3

Next, a head-mounted display according to Variation 3 of the embodiment will be described.

Figure 8:
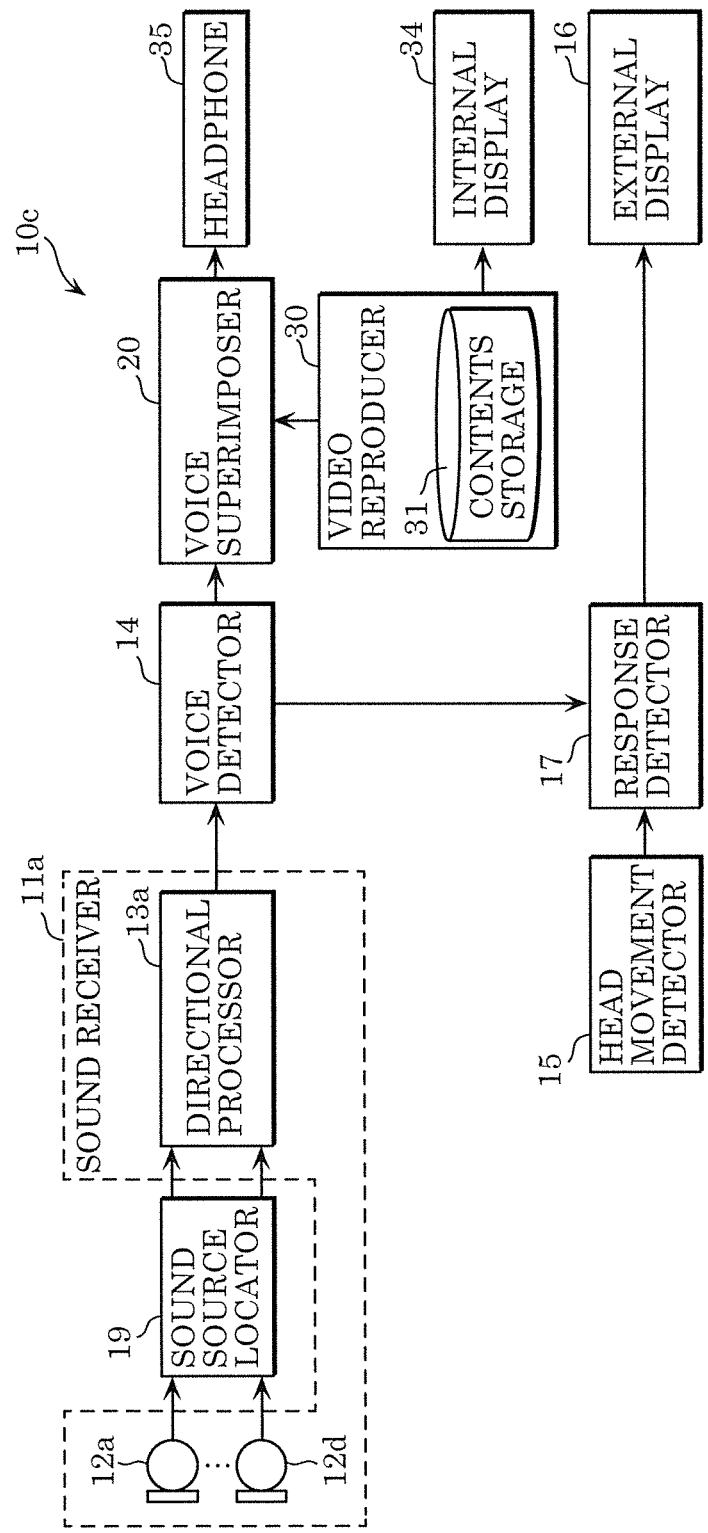
FIG. 8 is a block diagram showing a configuration of a head-mounted display according to Variation 3 of the embodiment.

FIG. 8 is a block diagram showing a configuration of head-mounted display 10c according to Variation 3 of the embodiment. Head-mounted display 10c is a head-mounted display that has a function of superimposing the voice of an outside person on a sound associated with a reproduced video and outputting the resultant to headphone set 35, and includes sound receiver 11a, voice detector 14, sound source locator 19, voice superimposer 20, head movement detector 15, external display 16, response detector 17, video reproducer 30, internal display 34, and headphone set 35.

Head-mounted display 10c according to the present variation basically has the same configuration as that of head-mounted display 10b according to Variation 2 of the embodiment, but is different from Variation 2 of the embodiment in that the present variation includes voice superimposer 20 as an additional structural element. Hereinafter, the present variation will be described focusing on the difference from Variation 2 of the embodiment.

Voice superimposer 20 is a processor that is configured to superimpose the voice detected by voice detector 14 on a sound associated with a video, and output the resultant to headphone set 35. At this time, voice superimposer 20 performs sound localization to cause the voice detected by voice detector 14 to be heard from a direction corresponding to the specific direction, and then superimposes the voice detected by voice detector 14 on a sound associated with a video. To be specific, voice superimposer 20 performs sound localization signal processing on the voice detected by voice detector 14 to cause the voice detected by voice detector 14 to be heard three-dimensionally (in other words, from the direction located by sound source locator 19), then assigns the voice to a reproduction channel of headphone set 35, and outputs the voice. For example, voice superimposer 20 performs sound localization signal processing on the voice detected by voice detector 14 in consideration of the shape of the human head (in other words, using a head-related transfer function) so that even when headphone set 35 has two channels, the voice of the outside person is heard three-dimensionally.

In the present variation, the wearer of head-mounted display 10c can hear the voice of the outside person, and thus headphone set 35 may be a closed headphone.

Also, voice superimposer 20 is typically implemented with software by a system circuit or a microcomputer that includes a ROM that stores a program, a RAM, a processor that executes the program, an input/output circuit for connecting to a peripheral circuit, and the like. However, the structural element may be implemented with hardware by a dedicated logic circuit such as an ASIC or a gate array that implements the processing operations.

Figure 9:
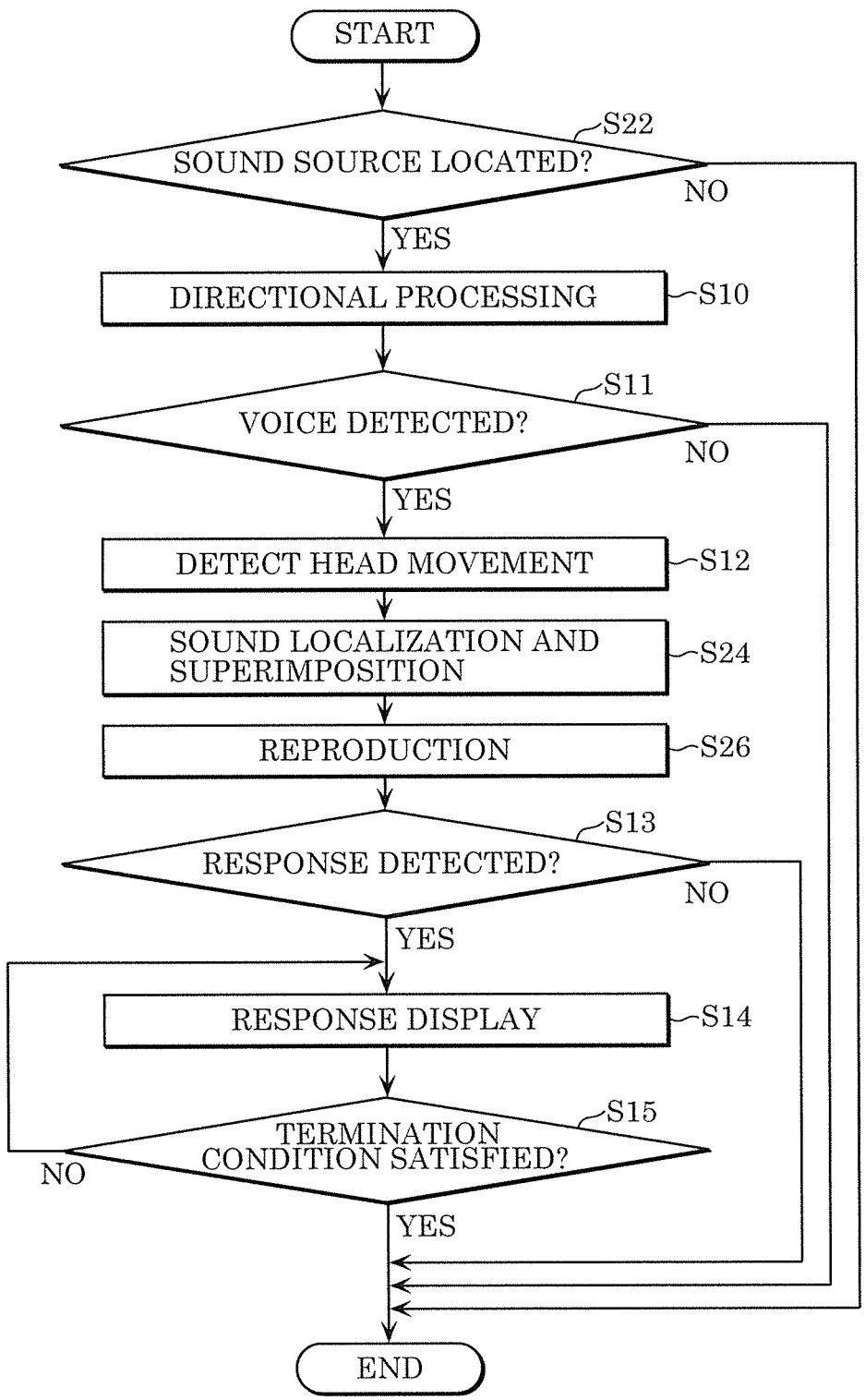
FIG. 9 is a flowchart illustrating operations performed by the head-mounted display according to Variation 3 of the embodiment.

FIG. 9 is a flowchart illustrating operations performed by head-mounted display 10c (or in other words, a control method of controlling head-mounted display 10c) according to the present variation. The operations are basically the same as those of the flowchart of Variation 2 of the embodiment shown in FIG. 7, but the present variation is different from Variation 2 of the embodiment in that steps S24 and S26 are added. Hereinafter, the present variation will be described focusing on the difference from Variation 2 of the embodiment.

In the present variation, when voice detector 14 detects the voice (YES in S11), voice superimposer 20 performs sound localization signal processing on the voice detected by voice detector 14 to cause the voice detected by voice detector 14 to be heard from a direction located by sound source locator 19 (S24), superimposes the voice detected by voice detector 14 on the sound reproduced by video reproducer 30, and outputs the resultant to headphone set 35 (S26).

The processing in the subsequent steps (from step S13 to the last step) is the same as that of the embodiment.

As described above, head-mounted display 10c according to the present variation includes, in addition to the structural elements of the embodiment, voice superimposer 20 that superimposes the voice detected by voice detector 14 on the sound associated with the video, and outputs the resultant to headphone set 35.

With this configuration, the voice of an outside person (for example, a cabin attendant) is superimposed on the sound associated with the video, and then output through headphone set 35. Accordingly, the wearer of head-mounted display 10c can hear the voice of the outside person while listening to the sound of the reproduced content, as a result of which it is possible to achieve further smooth communication between the wearer and the outside person.

Also, voice superimposer 20 performs sound localization to cause the voice detected by voice detector 14 to be heard from a direction corresponding to the specific direction, and then superimposes the voice detected by voice detector 14 on the sound associated with the video.

With this configuration, through the sound localization, the wearer of head-mounted display 10c can hear the voice of an outside person (for example, a cabin attendant) from the actual sound source direction, or a sound source direction corresponding to the actual sound source direction, and thus can easily recognize the direction in which the outside person who emitted the voice is present, as in the case where the wearer is not wearing head-mounted display 10c.

In the present variation, in the flowchart shown in FIG. 9, the sound localization superimposition (S24) and the reproduction (S26) are performed after the head movement detection (S12), but the order of performing the processing operations is not limited thereto. The sound localization superimposition (S24) and the reproduction (S26) may be performed prior to the head movement detection (S12), or the processing operations may be performed in parallel.

Variation 4

Next, as Variation 4 of the embodiment, an example will be described in which the head-mounted display according to the present disclosure is applied to an automobile remote control system. The remote control system includes a driving apparatus for remotely controlling an automobile, and an automobile that is connected to the driving apparatus via wireless communication and remotely controlled by the driving apparatus.

Figure 10A:
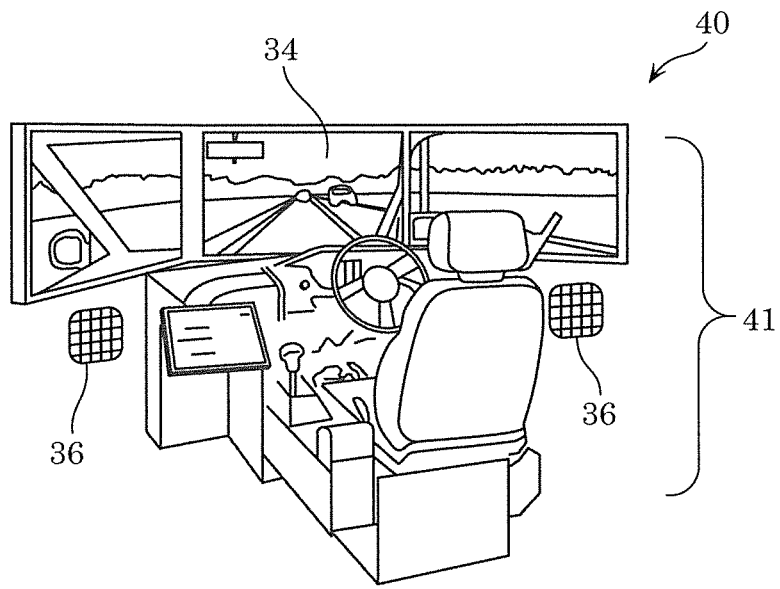
FIG. 10A is an external view of a driving apparatus that constitutes a remote control system according to Variation 4 of the embodiment.
Figure 10B:
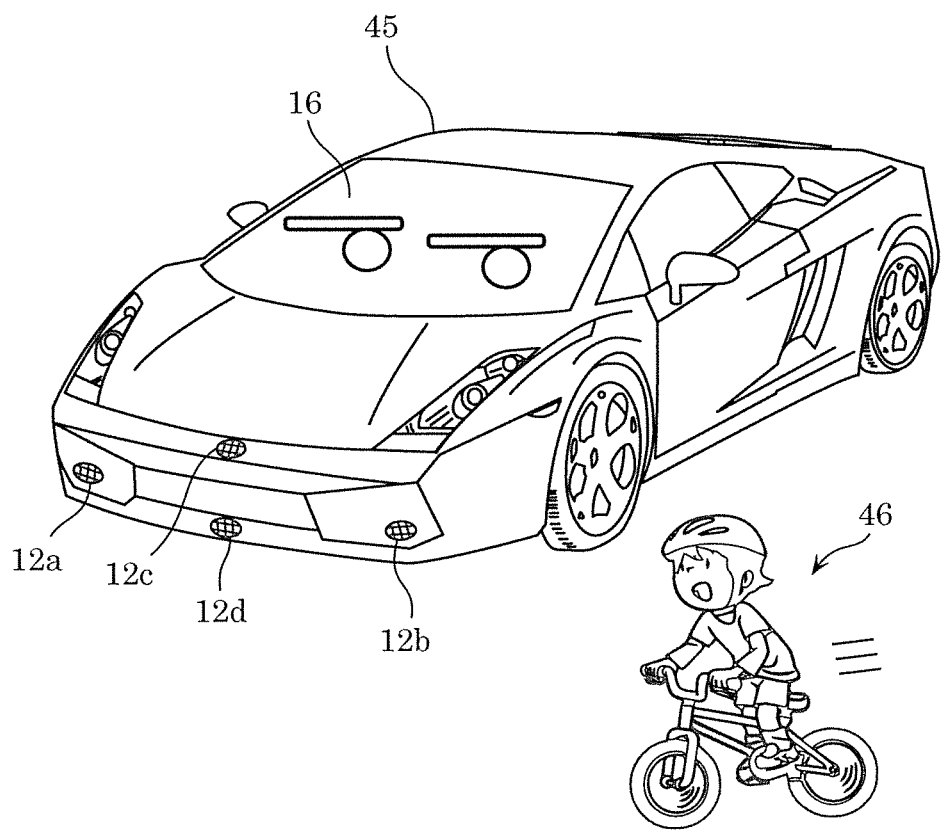
FIG. 10B is an external view of an automobile that constitutes the remote control system according to Variation 4 of the embodiment.

FIG. 10A is an external view of driving apparatus 41 that constitutes remote control system 40 according to Variation 4 of the embodiment. FIG. 10B is an external view of automobile 45 that constitutes remote control system 40 according to Variation 4 of the embodiment.

As shown in FIG. 10A, driving apparatus 41 is a simulated apparatus of the driver's seat of automobile 45, and is installed indoor or the like. Driving apparatus 41 includes a steering wheel for remotely controlling automobile 45, an accelerator, a brake, and the like.

A structural element (referred to as "internal display 34" here) corresponding to internal display 34 of the head-mounted display according to the embodiment is attached to the front surface of driving apparatus 41. In the present variation, a video transmitted from a camera that is installed on automobile 45 and is configured to capture images of the front of automobile 45 is displayed. Driving apparatus 41 is equipped with a set of speakers 36 that corresponds to the headphone set of the head-mounted display according to the embodiment. In the present variation, the set of speakers 36 includes multi-way speakers that reproduce the sounds received by microphones 12a to 12d attached to the front surface of automobile 45.

As shown in FIG. 10B, automobile 45 can travel in an unattended manner by being remotely controlled by driving apparatus 41. Structural elements (referred to as "microphones 12a to 12d" here) corresponding to microphones 12a to 12d of the head-mounted display according to the embodiment are attached at four locations on the front surface of automobile 45. Also, a structural element (referred to as "external display 16" here) corresponding to external display 16 of the head-mounted display according to the embodiment is attached to the front surface of the windshield of automobile 45.

Figure 11:
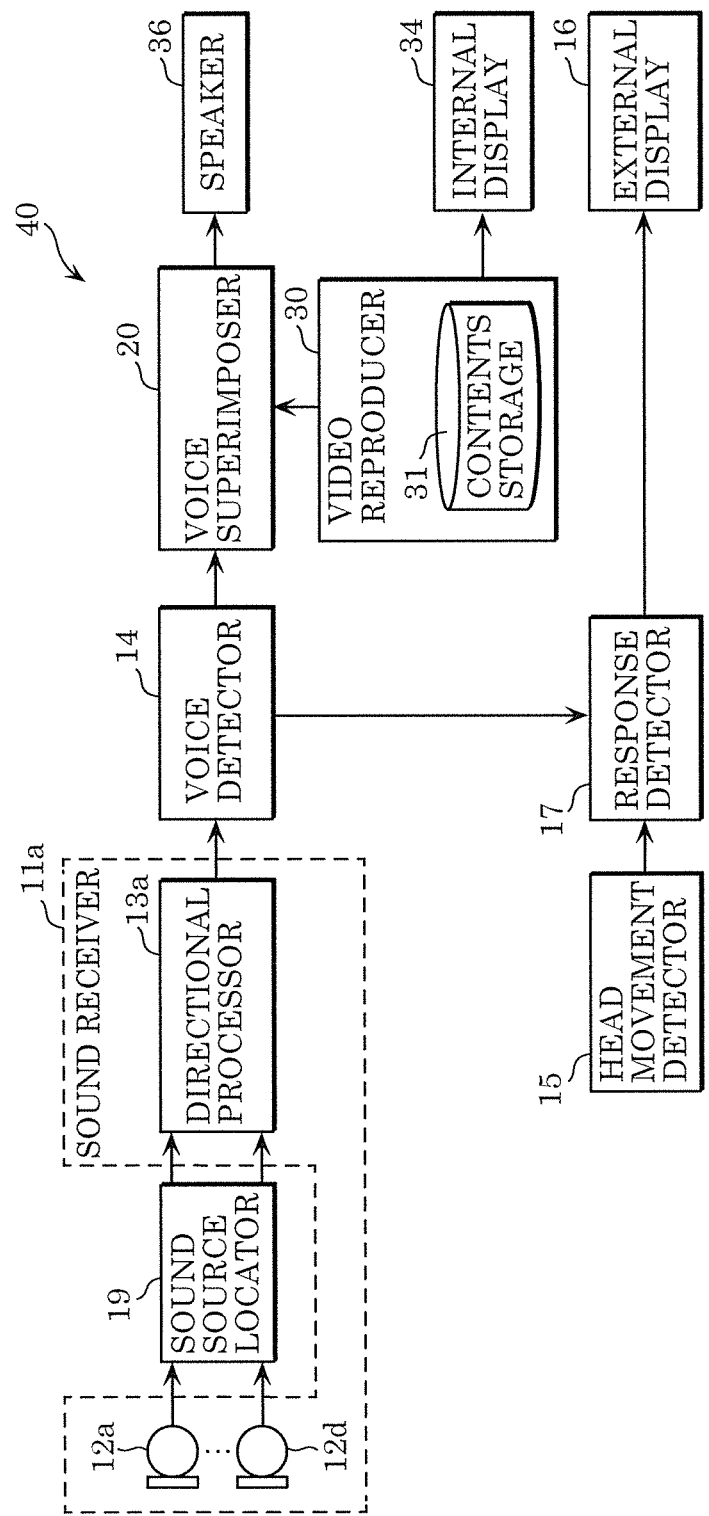
FIG. 11 is a block diagram showing main structural elements of the remote control system according to Variation 4 of the embodiment.

FIG. 11 is a block diagram showing main structural elements of remote control system 40 according to the present variation. The diagram shows, among the structural elements of remote control system 40, only structural elements to which the head-mounted display according to the embodiment is applied.

Remote control system 40 includes sound receiver 11a, voice detector 14, sound source locator 19, voice superimposer 20, head movement detector 15, external display 16, response detector 17, video reproducer 30, internal display 34, and a set of speakers 36. This configuration corresponds to that of head-mounted display 10c according to Variation 3 of the embodiment shown in FIG. 8, except that headphone set 35 is replaced by the set of speakers 36. However, in the present variation, video reproducer 30 is a camera as described above installed on automobile 45. Also, voice detector 14 detects a sound of the surroundings of the vehicle that has been registered in advance as a sound that warns of danger such as the braking noise of bicycle 46 shown in FIG. 10B. Also, head movement detector 15 is an acceleration sensor that is worn on the head of a remote control operator who operates driving apparatus 41, a camera that captures and detects movement of the head of the remote control operator, or the like. Also, typically, sound receiver 11a, video reproducer 30, and external display 16 are attached to automobile 45, and other structural elements are attached to driving apparatus 41, or the remote control operator.

As described above, remote control system 40 has, as the basic function, the same configuration as that of head-mounted display 10c according to Variation 3 of the embodiment, and thus produces the same advantageous effects as those of Variation 3 of the embodiment. That is, remote control system 40 includes voice superimposer 20 that performs signal processing on the sound of the surroundings of the vehicle such as the braking noise of bicycle 46 detected by voice detector 14 through sound localization such that the sound that warns of danger can be heard from a direction close to the actual sound source direction. Accordingly, when the head of the remote control operator moves toward the sound source direction of the sound of the surroundings of the vehicle such as the braking noise of bicycle 46, as shown in FIG. 10B, information indicating that the remote control operator has noticed the sound of the surroundings of the vehicle is displayed on external display 16 of automobile 45.

At this time, external display 16 of automobile 45 is also seen by people other than the driver of bicycle 46. In order for the driver of bicycle 46 to intuitively see that external display 16 displays information indicating that the driver of bicycle 46 has been noticed, external display 16 displays information at a position close to bicycle 46, or displays an arrow or an eye icon pointing toward the direction of bicycle 46, or mirror-displays a video of bicycle 46 captured by the camera, or the like.

With this configuration, the driver of bicycle 46 can visually understand that the operator of automobile 45 moving closer to the driver of bicycle 46 has noticed the braking noise of bicycle 46. Accordingly, with remote control system 40 to which the head-mounted display according to the present disclosure is applied, even though the remote control operator is in a location remote from the automobile and the surroundings of the automobile, it is possible to achieve smooth communication between the remote control operator and the outside person (the driver of bicycle 46 in this example).

Variation 5

Next, a head-mounted display according to Variation 5 of the embodiment will be described.

Figure 12:
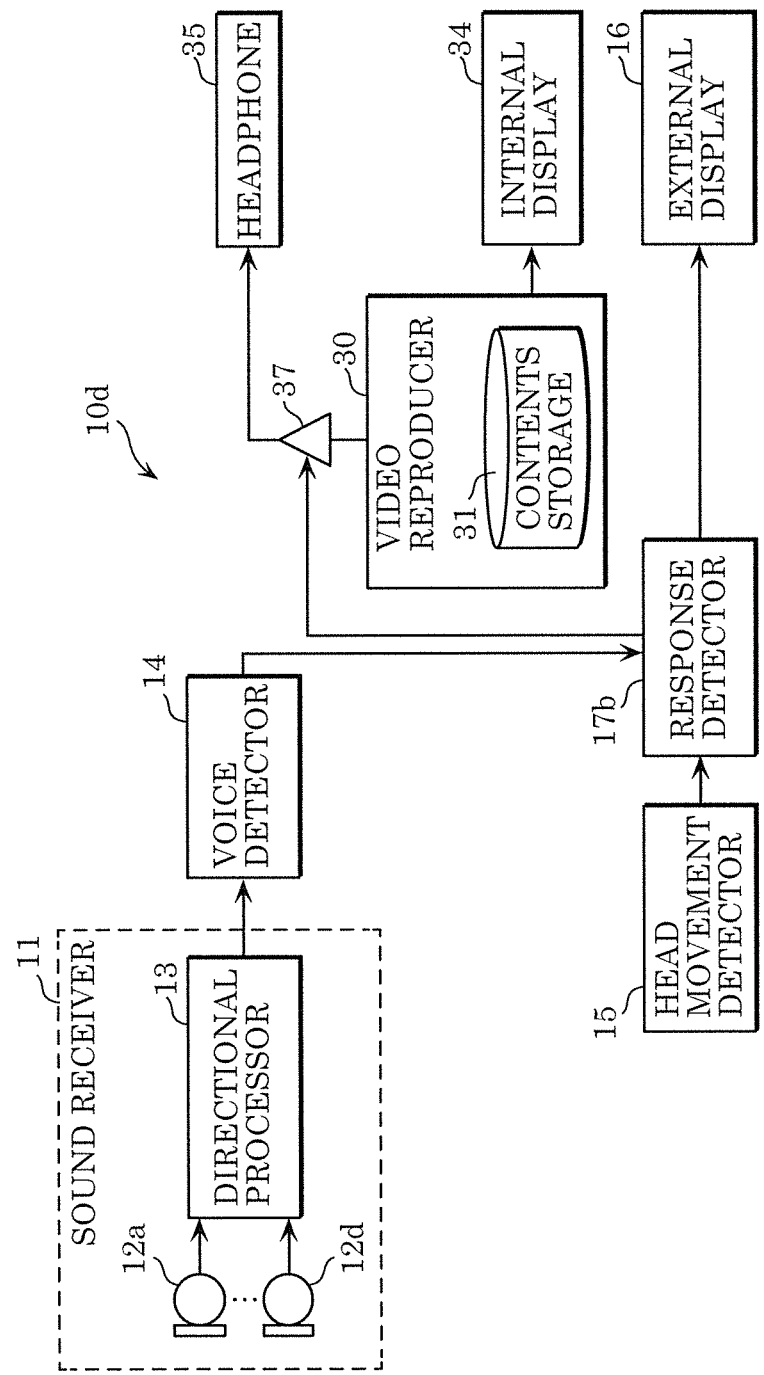
FIG. 12 is a block diagram showing a configuration of a head-mounted display according to Variation 5 of the embodiment.

FIG. 12 is a block diagram showing a configuration of head-mounted display 10d according to Variation 5 of the embodiment. Head-mounted display 10d is a head-mounted display that has a function of automatically lowering the sound volume level of the sound emitted by the headphone set, and includes sound receiver 11, voice detector 14, head movement detector 15, external display 16, response detector 17b, video reproducer 30, internal display 34, headphone set 35, and sound amplifier 37.

Head-mounted display 10d according to the present variation basically has the same configuration as that of head-mounted display 10 according to the embodiment, but is different from the embodiment in that the present variation includes sound amplifier 37 as an additional structural element and response detector 17b according to the variation. Hereinafter, the present variation will be described focusing on the difference from the embodiment.

Sound amplifier 37 is a sound volume level adjuster that is configured to amplify or attenuate the sound signal output from video reproducer 30 in accordance with a control instruction from response detector 17b and output the sound signal to headphone set 35. Sound amplifier 37 may be, for example, a variable gain amplifier.

Response detector 17b basically has the same function as that of response detector 17 according to the embodiment. In the present variation, response detector 17b further controls sound amplifier 37 so as to lower the sound volume level of the sound emitted by headphone set 35 when information indicating that the wearer has responded to the voice is displayed on external display 16.

Figure 13:
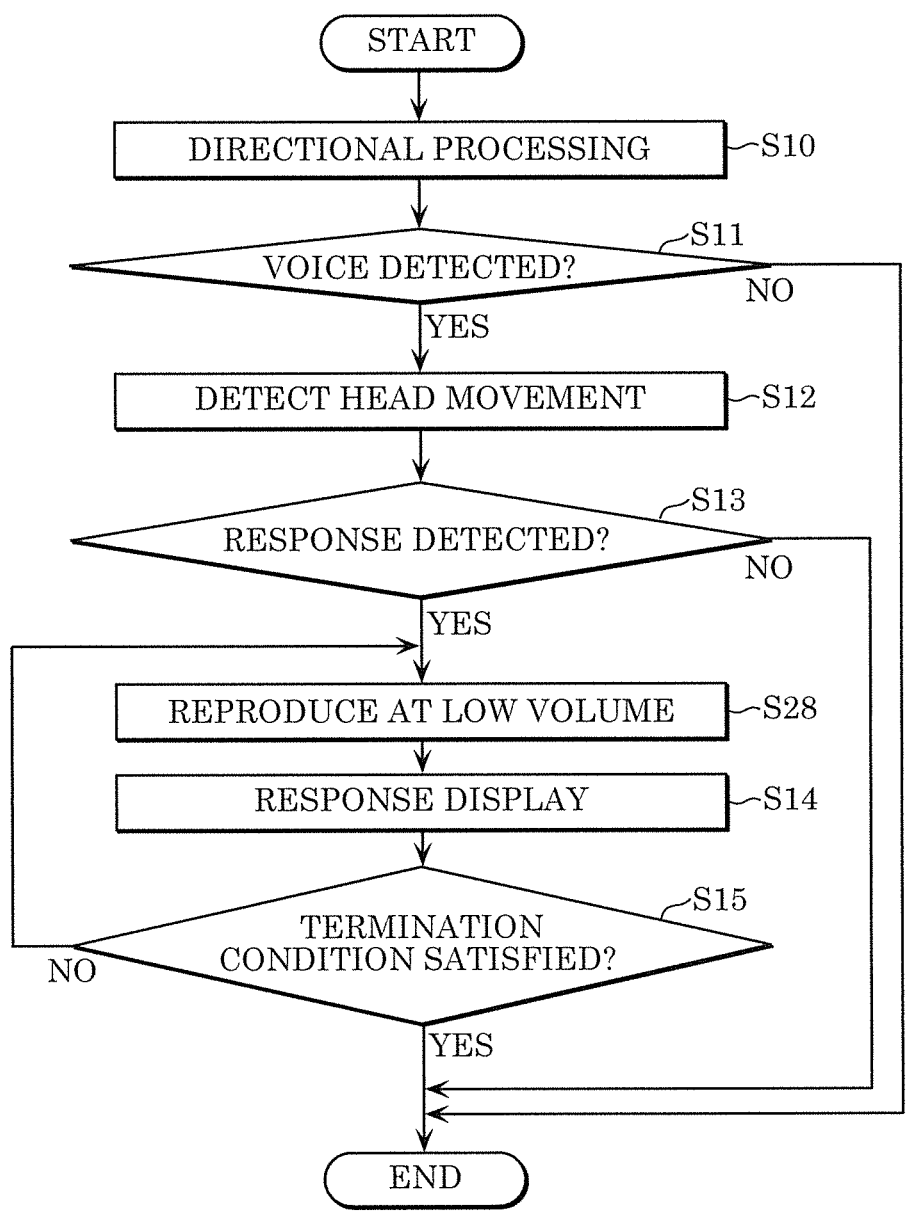
FIG. 13 is a flowchart illustrating operations performed by the head-mounted display according to Variation 5 of the embodiment.

FIG. 13 is a flowchart illustrating operations performed by head-mounted display 10d (or in other words, a control method of controlling head-mounted display 10d) according to the present variation. The operations are basically the same as those of the flowchart according to the embodiment shown in FIG. 3, but the present variation is different from the embodiment in that step S28 is added. Hereinafter, the present variation will be described focusing on the difference from the embodiment.

If it is determined that head movement detector 15 has detected movement of the head of the wearer facing toward the specific direction from which sound receiver 11 receives the sound (YES in S13), response detector 17b controls sound amplifier 37 so as to lower the sound volume level of the sound emitted by headphone set 35 (S28), and displays information indicating that the wearer has responded to the voice on external display 16 (response detection step S14).

As described above, head-mounted display 10d according to the present variation includes, in addition to the structural elements of the embodiment, sound amplifier 37 that is configured to adjust the sound volume level of the sound output from video reproducer 30. Response detector 17b controls sound amplifier 37 so as to lower the sound volume level of the sound emitted by headphone set 35 when information indicating that the wearer has responded to the voice is displayed on external display 16.

With this configuration, when an outside person emits his/her voice to the wearer, the sound volume level of the sound emitted by headphone set 35 is lowered. Accordingly, the wearer of head-mounted display 10d can hear the voice of the outside person while wearing head-mounted display 10d.

Variation 6

Next, a head-mounted display according to Variation 6 of the embodiment will be described.

Figure 14:
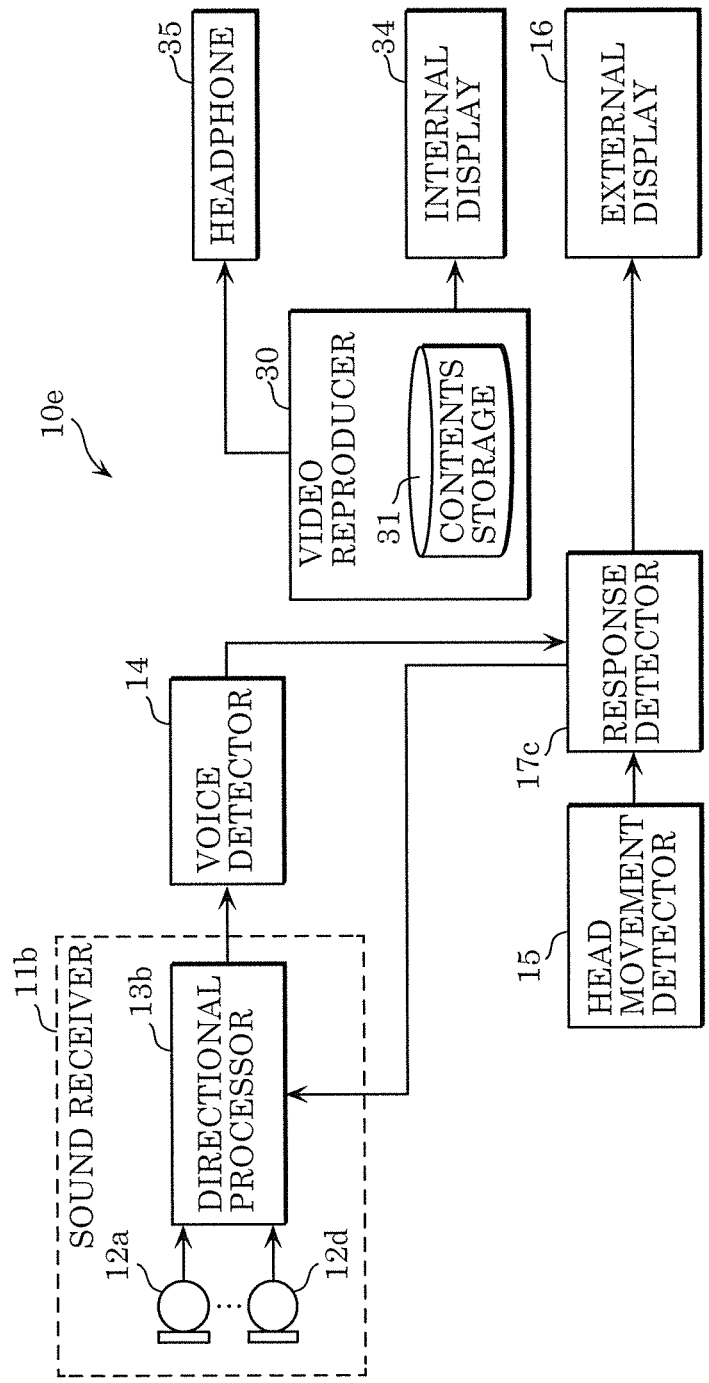
FIG. 14 is a block diagram showing a configuration of a head-mounted display according to Variation 6 of the embodiment.

FIG. 14 is a block diagram showing a configuration of head-mounted display 10e according to Variation 6 of the embodiment. Head-mounted display 10e is a head-mounted display that has a function of receiving not only the voice of an outside person but also the voice of the wearer, and includes sound receiver 11b, voice detector 14, head movement detector 15, external display 16, response detector 17c, video reproducer 30, internal display 34, and headphone set 35.

Head-mounted display 10e according to the present variation basically has the same configuration as that of head-mounted display 10 according to the embodiment, but is different from the embodiment in that the present variation includes sound receiver 11b and response detector 17c according to the variation. Hereinafter, the present variation will be described focusing on the difference from the embodiment.

Sound receiver 11b basically has the same function as that of sound receiver 11 according to the embodiment. In the present variation, sound receiver 11b includes directional processor 13b according to the variation. As with directional processor 13 according to the embodiment, directional processor 13b has a function of receiving only the sound coming from the specific direction by performing signal processing on the sound signals output from four microphones 12a to 12d. In the present variation, directional processor 13b further has a function of changing the sound receiving direction so as to receive the voice of the wearer in accordance with a control instruction from response detector 17c. To be specific, directional processor 13b performs, as signal processing, delay beamforming or the like that emphasizes the sound in a predetermined specific direction or the direction of the wearer by shifting delays of the sound signals output from four microphones 12a to 12d in accordance with a control instruction from response detector 17c.

Response detector 17c basically has the same function as that of response detector 17 according to the embodiment. In the present variation, when voice detector 14 detects the voice, and head movement detector 15 detects the movement of the head of the wearer facing toward the specific direction, response detector 17c further controls sound receiver 11b to change the sound receiving direction to cause sound receiver 11b to receive the voice of the wearer.

Figure 15:
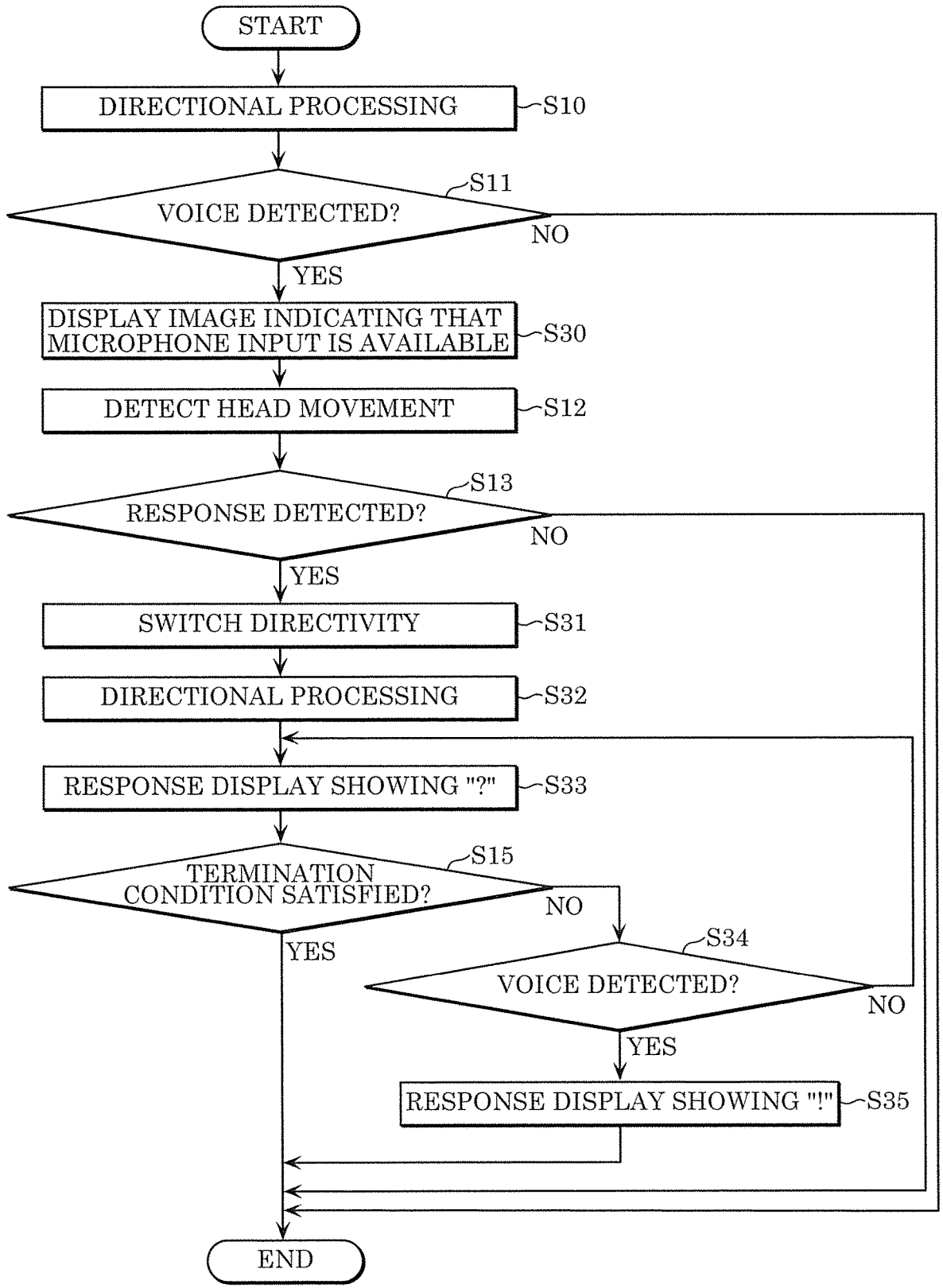
FIG. 15 is a flowchart illustrating operations performed by the head-mounted display according to Variation 6 of the embodiment.
Figure 16:
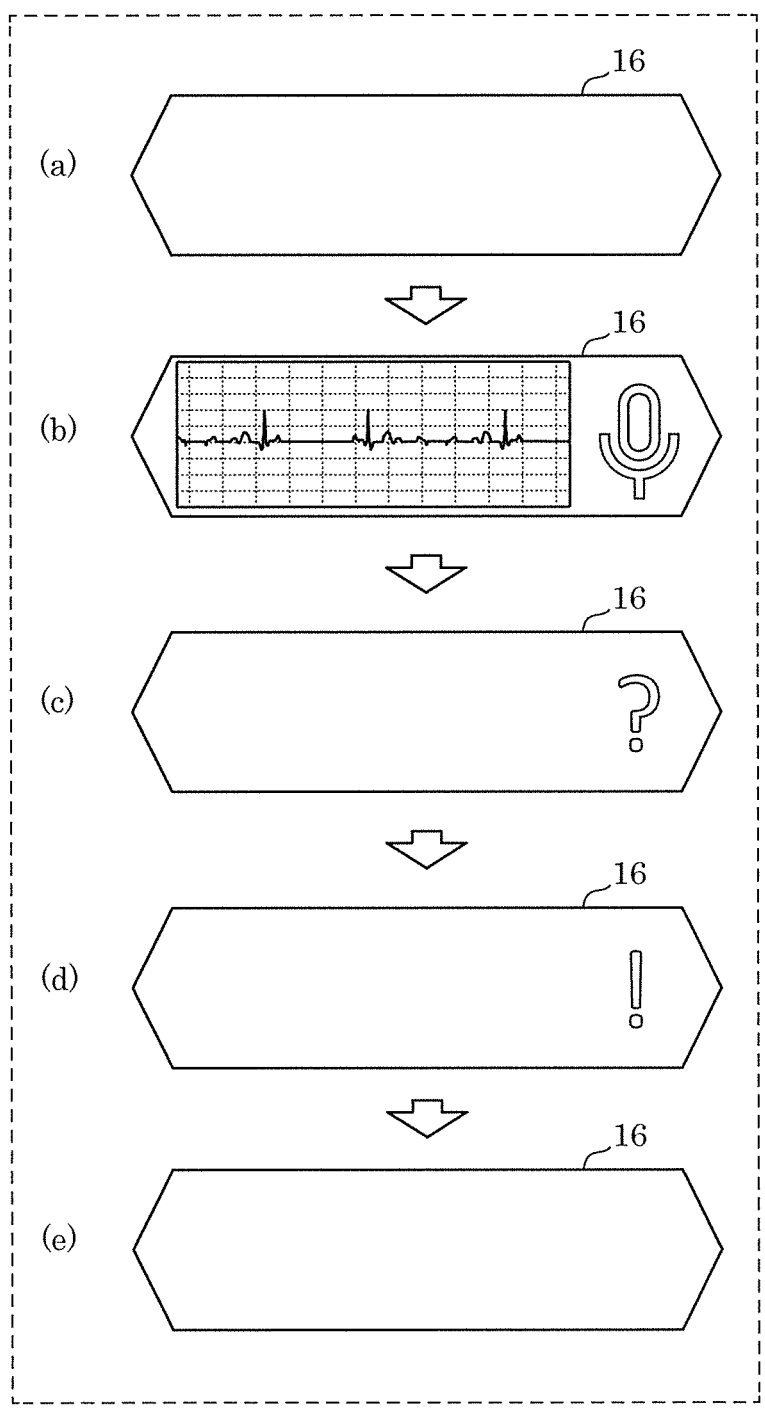
FIG. 16 is a diagram showing examples of display on an external display of the head-mounted display according to Variation 6 of the embodiment.

FIG. 15 is a flowchart illustrating operations performed by head-mounted display 10e (or in other words, a control method of controlling head-mounted display 10e) according to the present variation. FIG. 16 is a diagram showing examples of display on external display 16 of head-mounted display 10e according to the present variation.

The operations shown in FIG. 15 are basically the same as those of the flowchart according to the embodiment shown in FIG. 3, but the present variation is different from the embodiment in that the processing operations of displaying an image on external display 16 (S30, S33, and S35), the processing operations of controlling sound receiver 11b (S31 and S32), and the like are added. Hereinafter, the present variation will be described focusing on the difference from the embodiment.

If it is determined that a voice has been detected by voice detector 14 (YES in S11), response detector 17c displays, on external display 16, an image indicating that the voice has detected by voice detector 14 as shown in the example of display in (b) of FIG. 16, or in other words, an image (an image of a microphone in this example) indicating that microphones 12a to 12d are working while a cabin attendant is speaking to the wearer of head-mounted display 10e (S30). As a result, the display shown on external display 16 is changed from a display indicating a normal state (a blank display shown in (a) in FIG. 16 in this example) to a display indicating that microphones 12a to 12d are working ((b) of FIG. 16). The cabin attendant can thereby understand that the speech of the cabin attendant has been detected by microphones 12a to 12d of head-mounted display 10e.

Next, if it is determined that movement of the head of the wearer facing toward the specific direction from which sound receiver 11b receives the sound has been detected (YES in S13), response detector 17c controls sound receiver 11b to change the sound receiving direction to cause sound receiver 11b to receive the voice of the wearer (S31). As a result, sound receiver 11b performs directional processing so as to receive the voice of the wearer (S32).

Then, response detector 17c displays, as shown in the example of display of (c) in FIG. 16, an image (a question mark in this example) indicating that the wearer has responded on external display 16 (S33). The cabin attendant can thereby understand that the wearer of head-mounted display 10e has noticed the speech of the cabin attendant.

After that, response detector 17c determines whether or not the processing termination condition has been satisfied (S15). If it is determined that the processing termination condition has not been satisfied (NO in S15), response detector 17c determines whether or not the voice of the wearer has been detected via sound receiver 11b and voice detector 14 (S34). If it is determined that the voice of the wearer has not been detected (NO in S34), response detector 17c repeats the processing operations of displaying a response (S33) and determining whether or not the processing termination condition has been satisfied (S15).

On the other hand, if it is determined that the voice of the wearer has been detected (YES in S34), response detector 17c displays, as shown in the example of display of (d) in FIG. 16, an image indicating that the wearer has spoken, or in other words, the wearer has responded to the speech of the cabin attendant (an exclamation mark in this example) on external display 16 (S33). The cabin attendant can thereby understand that the wearer of head-mounted display 10e has responded to the speech of the cabin attendant.

After the display shown in (d) in FIG. 16 has been presented, response detector 17c determines that a set of conversation in which the wearer of head-mounted display 10e responded to the speech of the cabin attendant has ended. Then, as shown in the example of display of (e) in FIG. 16, the display on external display 16 is changed back to the same display as the display indicating the normal state shown in (a) in FIG. 16. The processing thereby ends.

As described above, in head-mounted display 10e according to the present variation, when voice detector 14 detects the voice, and head movement detector 15 detects the movement of the head of the wearer facing toward the specific direction, response detector 17c controls sound receiver 11b to change the sound receiving direction to cause sound receiver 11b to receive the voice of the wearer.

With this configuration, after the wearer has responded to the voice of the outside person by turning the face of the wearer toward the outside person, the sound receiving direction is changed so as to receive the voice of the wearer. Accordingly, the voice of the wearer emitted thereafter is received, as a result of which it is possible to achieve further smooth communication between the wearer and the outside person.

Variation 7

Next, head-mounted display according to Variation 7 of the embodiment will be described.

Figure 17:
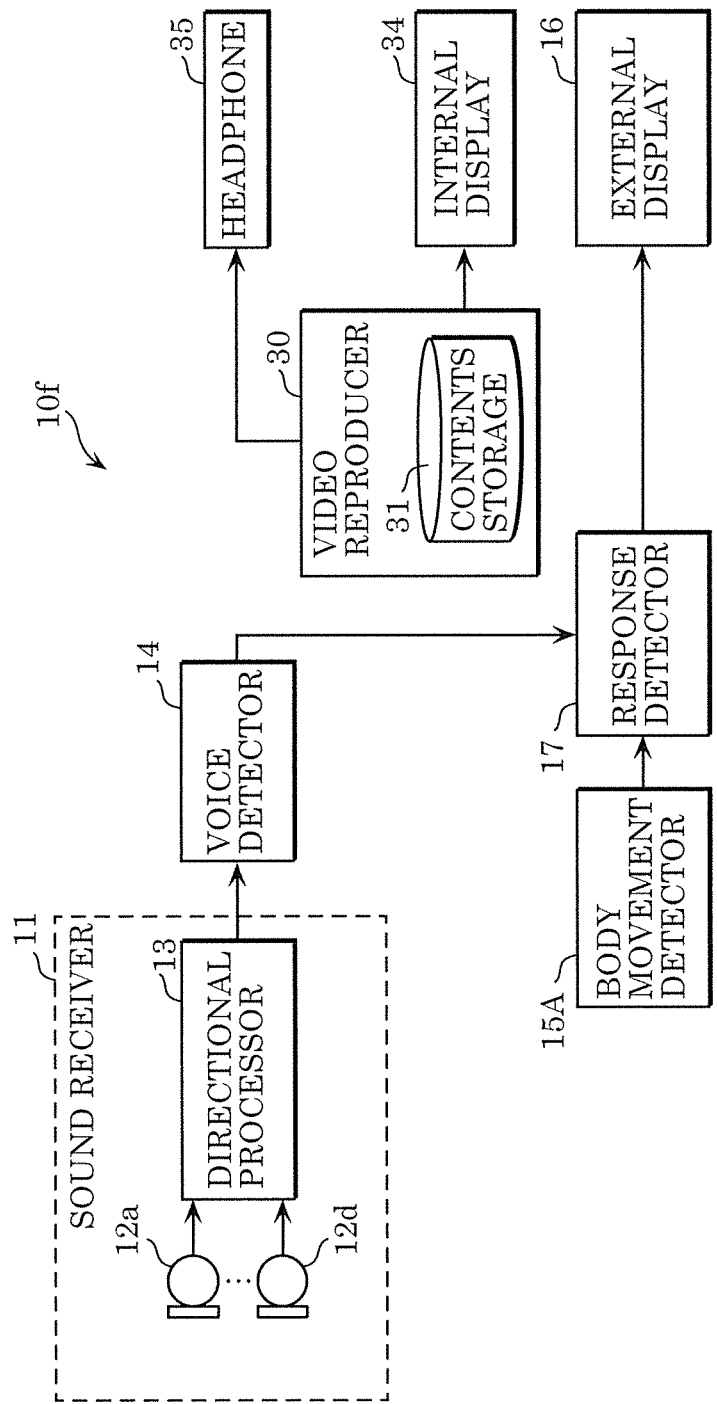
FIG. 17 is a block diagram showing a configuration of a head-mounted display according to Variation 7 of the embodiment.

FIG. 17 is a block diagram showing a configuration of head-mounted display 10f according to Variation 7 of the embodiment. Head-mounted display 10f is a head-mounted display that allows a wearer of head-mounted display 10f to perform smooth communication with an outside person that allows the wearer and the outside person to understand their intentions with each other while the wearer is wearing head-mounted display 10f, and includes sound receiver 11, voice detector 14, body movement detector 15A, external display 16, response detector 17, video reproducer 30, internal display 34, and headphone set 35.

Head-mounted display 10f according to the present variation basically has the same configuration as that of head-mounted display 10 according to the embodiment, but is different from the embodiment in that the present variation includes body movement detector 15A as an additional structural element that replaces head movement detector 15. Hereinafter, the present variation will be described focusing on the difference from the embodiment.

Body movement detector 15A detects the orientation of the body so as to determine whether the wearer has responded to the voice. As a means that detects the orientation of the body, it is possible to use a means that performs image recognition by using a camera image of the wearer of head-mounted display 10f, or a means that attaches an acceleration sensor or a gyroscope sensor to the body of the wearer of head-mounted display 10f. In the case where the wearer holds a remote controller in his/her hand, it is possible to use an acceleration sensor or a gyroscope sensor incorporated in the remote controller. Body movement detector 15A determines that the wearer has responded to the voice if it is detected that the body has moved toward the specific direction.

Figure 18:
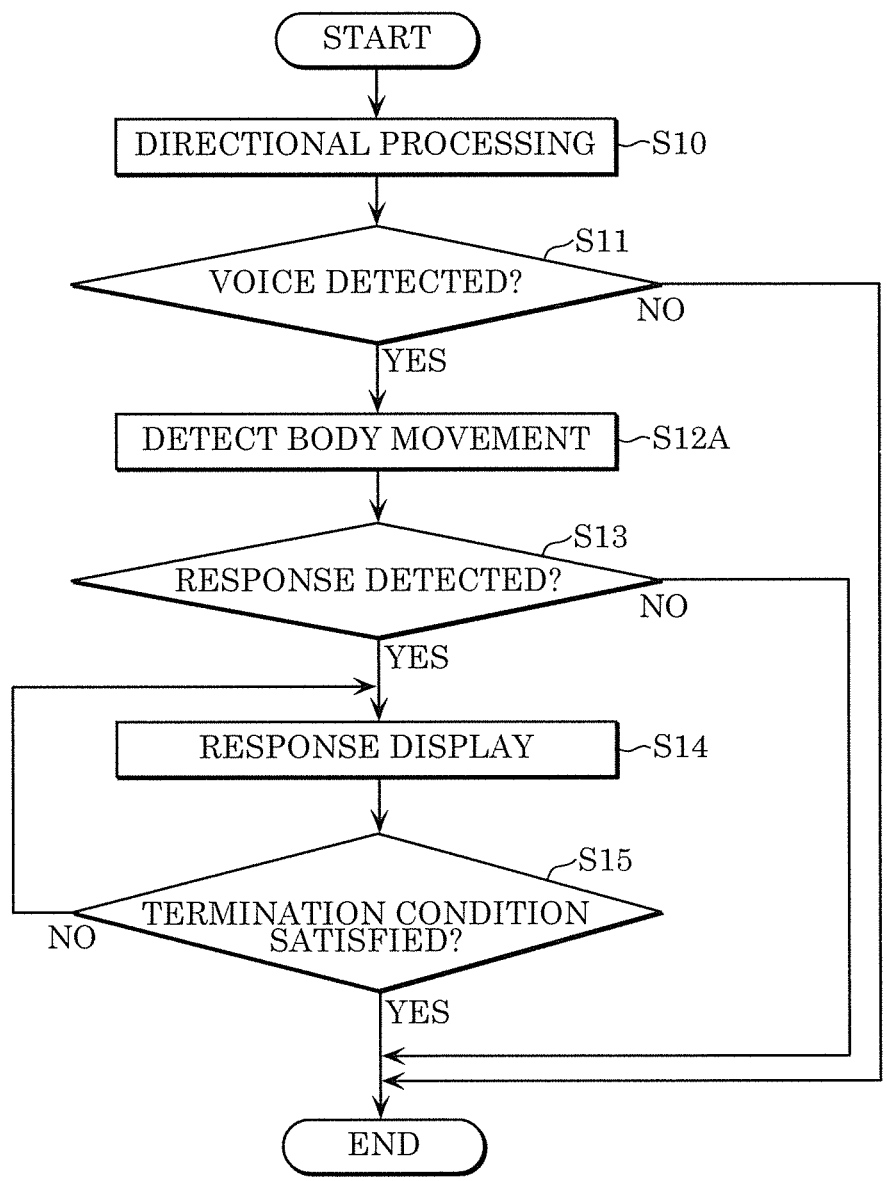
FIG. 18 is a flowchart illustrating operations performed by the head-mounted display according to Variation 7 of the embodiment.

FIG. 18 is a flowchart illustrating operations performed by head-mounted display 10f (or in other words, a control method of controlling head-mounted display 10f) according to the present variation. The operations are basically the same as those of the flowchart according to the embodiment shown in FIG. 3, but the present variation is different from the embodiment in that step S12 is replaced by step S12A. Hereinafter, the present variation will be described focusing on the difference from the embodiment.

If it is determined that a voice has been detected by voice detector 14 (YES in S11), response detector 17 advances the processing to step S12A. Otherwise (NO in S11), the processing ends.

Body movement detector 15A detects movement of the body of the wearer of head-mounted display 10f, and outputs a signal indicating the result of detection to response detector 17 (body movement detection step S12A).

Response detector 17 analyzes the signal output from body movement detector 15A, and thereby determines whether or not the wearer (a passenger in this example) of head-mounted display 10 has responded to the speech of the cabin attendant (S13).

To be specific, if it is determined that body movement detector 15A has detected movement of the body of the wearer facing toward the specific direction from which sound receiver 11 receives the sound (YES in S13), response detector 17 determines that the wearer has responded to the speech of the cabin attendant, and displays information indicating that the wearer has responded to the voice on external display 16 (response detection step S14).

After that, response detector 17 determines whether or not a processing termination condition has been satisfied (S15), and continues to display the information indicating that the wearer has responded to the voice on external display 16 until the processing termination condition has been satisfied. As used herein, "processing termination condition" refers to the situation where the wearer no longer responds to the voice. For example, the processing termination condition may be the situation where body movement detector 15A no longer detects the movement of the body of the wearer facing toward the specific direction from which sound receiver 11 receives the sound.

On the other hand, if it is determined that body movement detector 15A has not detected movement of the body of the wearer facing toward the specific direction from which sound receiver 11 receives the sound (NO in S13), response detector 17 determines that the wearer did not respond to the speech of the cabin attendant, and the processing ends.

As described above, head-mounted display 10f according to the present embodiment is a head-mounted display that presents a video, and includes sound receiver 11 that receives a sound coming from a specific direction, voice detector 14 that detects a voice from the sound received by sound receiver 11, body movement detector 15A that detects the orientation of the body of the wearer of head-mounted display 10f, external display 16 that displays externally visible information, and response detector 17 that, when voice detector 14 detects the voice, and body movement detector 15A detects the movement of the body of the wearer facing toward the specific direction, displays information indicating that the wearer has responded to the voice on external display 16.

Also, the control method of controlling head-mounted display 10f according to the present variation is a control method of controlling head-mounted display 10f that presents a video, the control method including: sound receiving step S10 of receiving a sound coming from a specific direction, voice detection step S11 of detecting a voice from the sound received in sound receiving step S10, body movement detection step S12A of detecting an orientation of the body of the wearer of head-mounted display 10f, and response detection step S14 of, when the voice is detected in voice detection step S11, and movement of the body of the wearer facing toward the specific direction is detected in body movement detection step S12A, displaying information indicating that the wearer has responded to the voice on external display 16 that displays externally visible information.

With this configuration, when movement of the body of the wearer of head-mounted display 10f toward the specific direction, which is set to be the sound source direction from which the voice of the outside person is coming, is detected, information indicating that the wearer has responded to the voice is displayed on external display 16. Accordingly, when the wearer indicates his/her intention to respond to the voice of the outside person, information indicating that fact is displayed on external display 16, and it is therefore possible to achieve smooth communication that allows the wearer and the outside person to understand their intentions with each other.

In the present variation, in the flowchart shown in FIG. 18, the body movement detection (S12A) is performed after the directional processing (S10) and the voice detection (S11), but the order of performing the processing operations is not limited thereto. The body movement detection (S12A) may be performed prior to the directional processing (S10) and the voice detection (S11), or the processing operations may be performed in parallel.

Variation 8

Next, a head-mounted display according to Variation 8 of the embodiment will be described.

Figure 19:
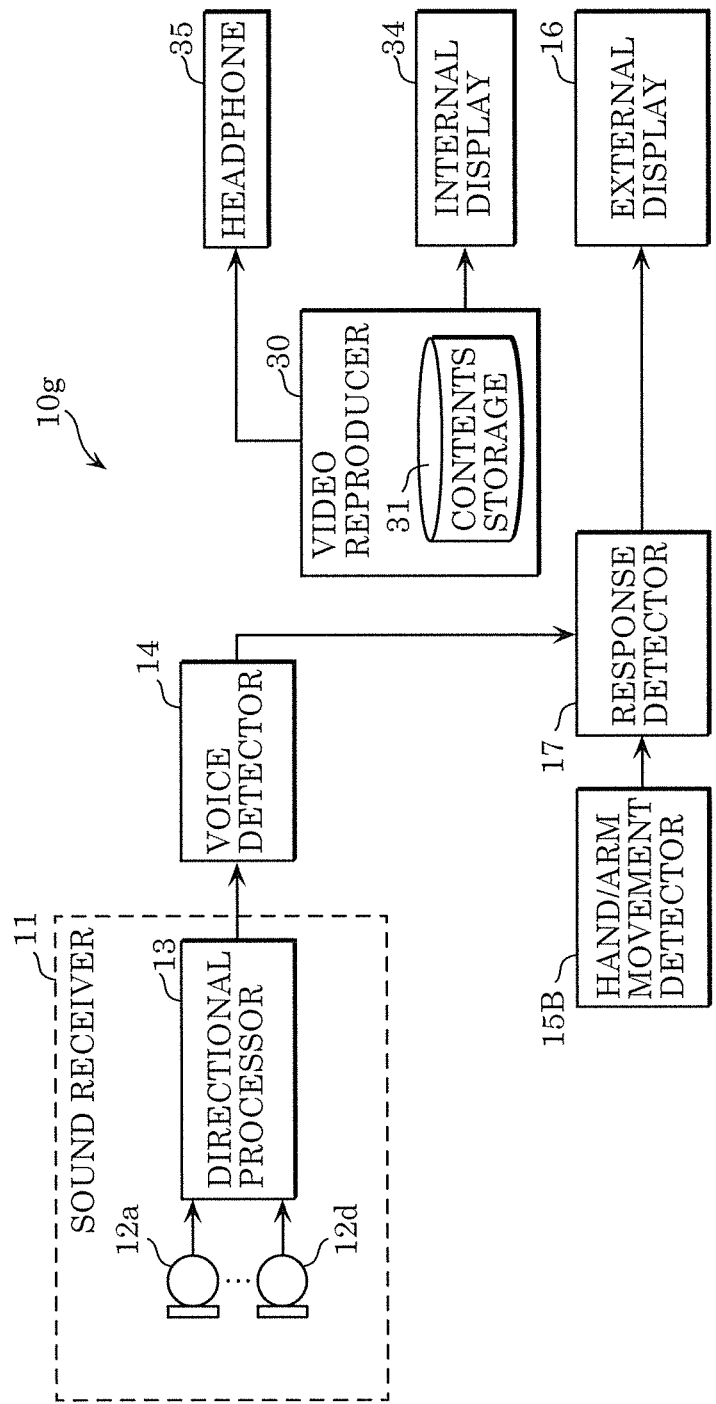
FIG. 19 is a block diagram showing a configuration of a head-mounted display according to Variation 8 of the embodiment.

FIG. 19 is a block diagram showing a configuration of head-mounted display 10g according to Variation 8 of the embodiment. Head-mounted display 10g is a head-mounted display that allows a wearer of head-mounted display 10g to perform smooth communication with an outside person that allows the wearer and the outside person to understand their intentions with each other while the wearer is wearing head-mounted display 10g, and includes sound receiver 11, voice detector 14, hand/arm movement detector 15B, external display 16, response detector 17, video reproducer 30, internal display 34, and headphone set 35.

Head-mounted display 10g according to the present variation basically has the same configuration as that of head-mounted display 10 according to the embodiment, but is different from the embodiment in that the present variation includes hand/arm movement detector 15B as an additional structural element that replaces head movement detector 15. Hereinafter, the present variation will be described focusing on the difference from the embodiment.

Hand/arm movement detector 15B detects a hand or arm movement so as to determine whether the wearer has responded to the voice. As a means that detects a hand or arm movement, it is possible to use a means that performs image recognition by using a camera image of the wearer of head-mounted display 10g, or a means that attaches an acceleration sensor or a gyroscope sensor to the body of the wearer of head-mounted display 10g. In the case where the wearer holds a remote controller in his/her hand, it is possible to use an acceleration sensor or a gyroscope sensor incorporated in the remote controller. Hand/arm movement detector 15B determines that the wearer has responded to the voice if a predetermined movement of the hand or the arm (for example, raising hand, or the like) is detected.

Figure 20:
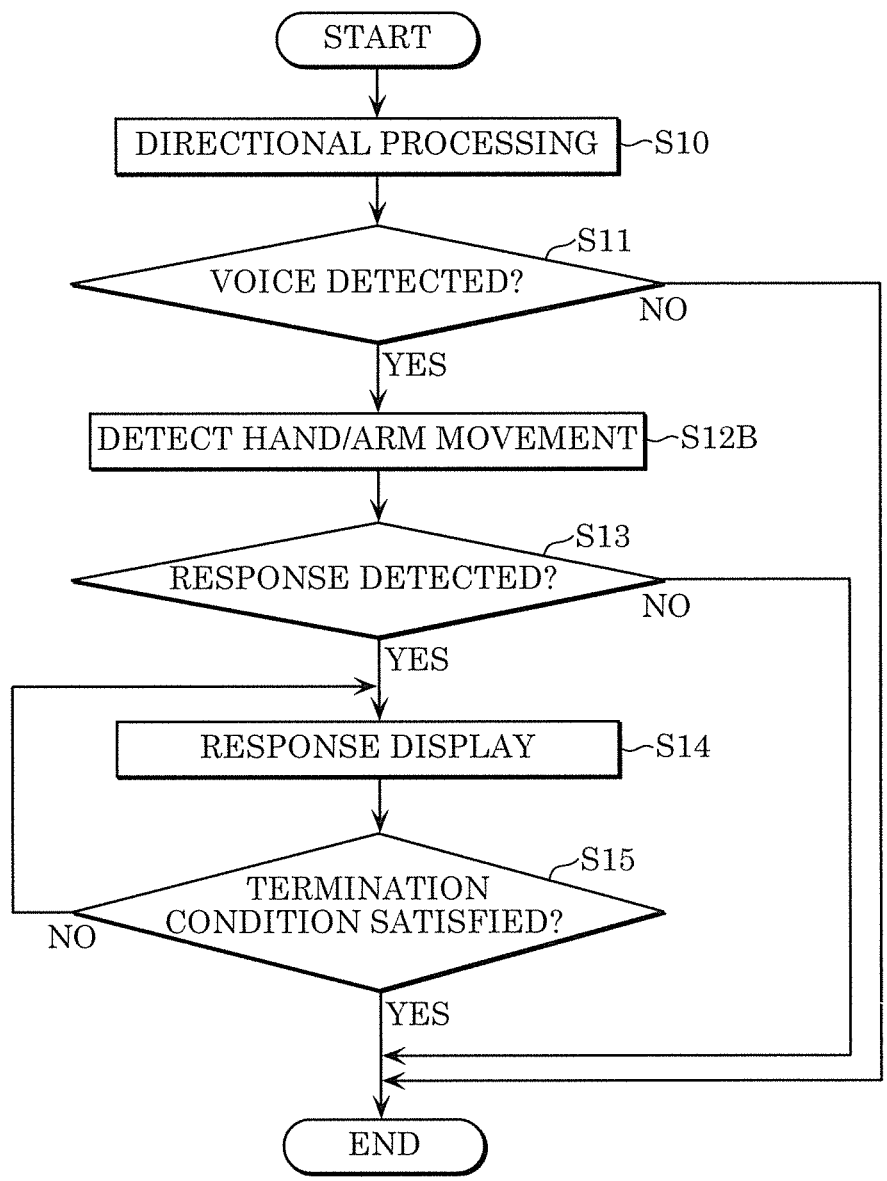
FIG. 20 is a flowchart illustrating operations performed by the head-mounted display according to Variation 8 of the embodiment.

FIG. 20 is a flowchart illustrating operations performed by head-mounted display 10g (or in other words, a control method of controlling head-mounted display 10g) according to the present variation. The operations are basically the same as those of the flowchart according to the embodiment shown in FIG. 3, but the present variation is different from the embodiment in that step S12 is replaced by step S12B. Hereinafter, the present variation will be described focusing on the difference from the embodiment.

If it is determined that a voice has been detected by voice detector 14 (YES in S11), response detector 17 advances the processing to step S12B. Otherwise (NO in S11), the processing ends.

Hand/arm movement detector 15B detects movement of the hand or arm of the wearer of head-mounted display 10g, and outputs a signal indicating the result of detection to response detector 17 (hand/arm movement detection step S12B).

Response detector 17 analyzes the signal output from hand/arm movement detector 15B, and thereby determines whether or not the wearer (a passenger in this example) of head-mounted display 10g has responded to the speech of the cabin attendant (S13).

To be specific, if hand/arm movement detector 15B detects a predetermined movement of the hand or the arm of the wearer toward the specific direction from which sound receiver 11 receives the sound (YES in S13), response detector 17 determines that the wearer has responded to the speech of the cabin attendant, displays information indicating that the wearer has responded to the voice on external display 16 (response detection step S14).

After that, response detector 17 determines whether or not a processing termination condition has been satisfied (S15), and continues to display the information indicating that the wearer has responded to the voice on external display 16 until the processing termination condition has been satisfied. As used herein, "processing termination condition" refers to the situation where the wearer no longer responds to the voice. For example, the processing termination condition may be the situation where hand/arm movement detector 15B no longer detects the predetermined movement of the hand or the arm of the wearer.

On the other hand, if it is determined that hand/arm movement detector 15B has not detected a predetermined movement of the hand or the arm of the wearer (NO in S13), response detector 17 determines that the wearer did not respond to the speech of the cabin attendant, and the processing ends.

As described above, head-mounted display 10g according to the present embodiment is a head-mounted display that presents a video, and includes sound receiver 11 that receives a sound coming from a specific direction, voice detector 14 that detects a voice from the sound received by sound receiver 11, hand/arm movement detector 15B that detects movement of the hand or the arm of the wearer of head-mounted display 10g, external display 16 that displays externally visible information, and response detector 17 that, when voice detector 14 detects the voice, and hand/arm movement detector 15B detects a predetermined movement of the hand or the arm of the wearer, displays information indicating that the wearer has responded to the voice on external display 16.

Also, the control method of controlling head-mounted display 10g according to the present variation is a control method of controlling head-mounted display 10g that presents a video, and includes sound receiving step S10 of receiving a sound coming from a specific direction, voice detection step S11 of detecting a voice from the sound received in sound receiving step S10, hand/arm movement detection step S12B of detecting movement of the hand or the arm of the wearer of head-mounted display 10g, and response detection step S14 of, when the voice is detected in voice detection step S11, and a predetermined movement of the hand or the arm of the wearer is detected in hand/arm movement detection step S12B, displaying information indicating that the wearer has responded to the voice on external display 16 that displays externally visible information.

With this configuration, when movement of the hand or the arm of the wearer of head-mounted display 10g toward the specific direction, which is set to be the sound source direction from which the voice of the outside person is coming, is detected, information indicating that the wearer has responded to the voice is displayed on external display 16. Accordingly, when the wearer indicates his/her intention to respond to the voice of the outside person, the intention is displayed on external display 16, and it is therefore possible to achieve smooth communication that allows the wearer and the outside person to understand their intentions with each other.

In the present variation, in the flowchart shown in FIG. 20, the hand/arm movement detection (S12B) is performed after the directional processing (S10) and the voice detection (S11), but the order of performing the processing operations is not limited thereto. The hand/arm movement detection (S12B) may be performed prior to the directional processing (S10) and the voice detection (S11), or the processing operations may be performed in parallel.

The head-mounted display and the control method of controlling a head-mounted display according to the present disclosure have been described by way of the embodiment and the variations. However, the present disclosure is not limited to the embodiment and the variations given above. Other embodiments obtained by making various modifications that can be conceived by a person having ordinary skill in the art to the embodiment and the variations given above as well as embodiments implemented by any combination of the structural elements of the embodiment and the variations given above are also encompassed within the scope of the present disclosure without departing from the scope of the present disclosure.

For example, it is possible to add sound source locator 19 of Variation 2, voice superimposer 20 of Variation 3, and sound amplifier 37 of Variation 5 to head-mounted display 10a according to Variation 1 of the embodiment, and the response detector may have the functions of these variations. With this configuration, it is possible to implement a sophisticated head-mounted display that produces the advantageous effects of the variations.

Also, the structural elements of the embodiment and each of the variations may be implemented by dedicated hardware, or may be implemented by executing a software program suitable for each structural element. Each structural element may be implemented by a program executer such as a CPU or a processor reading and executing a software program recorded on a recording medium such as a hard disk or a semiconductor memory. The software that implements the head-mounted displays and the like of the embodiment and the variations includes a program as described below.

That is, the program causes a computer to execute a control method of controlling a head-mounted display that presents a video. The control method is a control method of controlling head-mounted display 10 that presents a video, and the control method includes sound receiving step S10 of receiving a sound coming from a specific direction, voice detection step S11 of detecting a voice from the sound received in sound receiving step S10, head movement detection step S12 of detecting movement of the head of the wearer of head-mounted display 10, and response detection step S14 of, when the voice is detected in voice detection step S11, and movement of the head of the wearer facing toward the specific direction is detected in head movement detection step S12, displaying information indicating that the wearer has responded to the voice on external display 16 that displays externally visible information.

Also, the program may be configured by replacing head movement detection step S12 of detecting movement of the head of the wearer of head-mounted display 10 by body movement detection step S12A of detecting an orientation of the body of the wearer of head-mounted display 10f, or hand/arm movement detection step S12B of detecting a predetermined movement of the hand or the arm of the wearer of head-mounted display 10g.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present invention can be used as a head-mounted display or a remote control system, in particular, a head-mounted display that allows a wearer of the head-mounted display and an outside person to perform smooth communication that allows the wearer and the outside person to understand their intentions with each other, or a remote control system.

What is claimed is:

1. A head-mounted display that presents a video, the head-mounted display comprising:
   a sound receiver that receives a sound coming from a specific direction;
   a voice detector that detects a voice from the sound received by the sound receiver;
   a head movement detector that detects movement of a head of a wearer of the head-mounted display;
   an external display that displays externally visible information; and
   a response detector that, when the voice detector detects the voice and the head movement detector detects movement of the head of the wearer facing toward the specific direction, displays information indicating that the wearer has responded to the voice on the external display,
   wherein, when the voice detector detects the voice, and then the head movement detector detects movement of the head of the wearer facing toward the specific direction, the response detector displays an image indicating that the wearer has responded on the external display.

2. The head-mounted display according to claim 1, further comprising:
   a speaking person identifier that determines whether or not the voice detected by the voice detector is a voice of a predetermined speaking person,
   wherein the response detector displays the information on the external display when the speaking person identifier determines that the voice is the voice of the predetermined speaking person, and the head movement detector detects the movement of the head of the wearer facing toward the specific direction.

3. The head-mounted display according to claim 1, further comprising:
   a sound source locator that locates a sound source,
   wherein the sound receiver receives a sound coming from a direction of the sound source located by the sound source locator as the sound coming from the specific direction.

4. The head-mounted display according to claim 1, further comprising:
   a headphone set that emits a sound associated with the video to the wearer; and
   a voice superimposer that superimposes the voice detected by the voice detector on the sound associated with the video, and outputs a resultant to the headphone set.

5. The head-mounted display according to claim 4,
   wherein the voice superimposer performs sound localization to cause the voice detected by the voice detector to be heard from a direction corresponding to the specific direction, and then superimposes the voice detected by the voice detector on the sound associated with the video.

6. The head-mounted display according to claim 1, further comprising:
   a headphone set that emits a sound associated with the video to the wearer,
   wherein the response detector lowers a sound volume level of the sound emitted by the headphone set when the information is displayed on the external display.

7. The head-mounted display according to claim 1,
   wherein, when the voice detector detects the voice, and the head movement detector detects the movement of the head of the wearer facing toward the specific direction, the response detector controls the sound receiver to change a sound receiving direction to cause the sound receiver to receive a voice of the wearer.

8. A control method of controlling a head-mounted display that presents a video, the control method comprising:
   receiving a sound coming from a specific direction;
   detecting a voice from the sound received in the sound receiving;
   detecting movement of a head of a wearer of the head-mounted display;
   when the voice is detected in the detecting of the voice, and movement of the head of the wearer facing toward the specific direction is detected in the detecting of the movement of the head, displaying information indicating that the wearer has responded to the voice on an external display that displays externally visible information; and
   when the voice is detected in the detecting of the voice, and then movement of the head of the wearer facing toward the specific direction is detected in the detecting of the movement of the head, displaying an image indicating that the wearer has responded on the external display.

9. A non-transitory computer-readable recording medium for use in a computer, the recording medium having a computer program recorded thereon for causing the computer to execute the control method according to claim 8.

10. A head-mounted display that presents a video, the head-mounted display comprising:
    a sound receiver that receives a sound coming from a specific direction;
    a voice detector that detects a voice from the sound received by the sound receiver;
    a body movement detector that detects an orientation of a body of a wearer of the head-mounted display;
    an external display that displays externally visible information; and a response detector that, when the voice detector detects the voice, and the body movement detector detects movement of the body of the wearer facing toward the specific direction, displays information indicating that the wearer has responded to the voice on the external display, wherein, when the voice detector detects the voice, and then the body movement detector detects movement of the body of the wearer facing toward the specific direction, the response detector displays an image indicating that the wearer has responded on the external display.

11. A control method of controlling a head-mounted display that presents a video, the control method comprising:

receiving a sound coming from a specific direction;

detecting a voice from the sound received in the sound receiving;

detecting an orientation of a body of a wearer of the head-mounted display;

when the voice is detected in the detecting of the voice, and movement of the body of the wearer facing toward the specific direction is detected in the detecting of the movement of the body, displaying information indicating that the wearer has responded to the voice on an external display that displays externally visible information; and when the voice is detected in the detecting of the voice, and then movement of the body of the wearer facing toward the specific direction is detected in the detecting of the movement of the body, displaying an image indicating that the wearer has responded on the external display.

12. A head-mounted display that presents a video, the head-mounted display comprising:

a sound receiver that receives a sound coming from a specific direction;

a voice detector that detects a voice from the sound received by the sound receiver;

a hand/arm movement detector that detects movement of a hand or an arm of a wearer of the head-mounted display;

an external display that displays externally visible information; and a response detector that, when the voice detector detects the voice, and the hand/arm movement detector detects a predetermined movement of the hand or the arm of the wearer, displays information indicating that the wearer has responded to the voice on the external display, wherein, when the voice detector detects the voice, and then the hand/arm movement detector detects the predetermined movement of the hand or the arm of the wearer, the response detector displays an image indicating that the wearer has responded on the external display.

13. A control method of controlling a head-mounted display that presents a video, the control method comprising:

receiving a sound coming from a specific direction;

detecting a voice from the sound received in the sound receiving;

detecting movement of a hand or an arm of a wearer of the head-mounted display;

when the voice is detected in the detecting of the voice, and a predetermined movement of the hand or the arm of the wearer is detected in the detecting of the movement of the hand or the arm, displaying information indicating that the wearer has responded to the voice on an external display that displays externally visible information; and when the voice is detected in the detecting of the voice, and then the predetermined movement of the hand or the arm of the wearer is detected in the detecting of the movement of the hand or the arm, displaying an image indicating that the wearer has responded on the external display.

* * * * *